Figure 1:
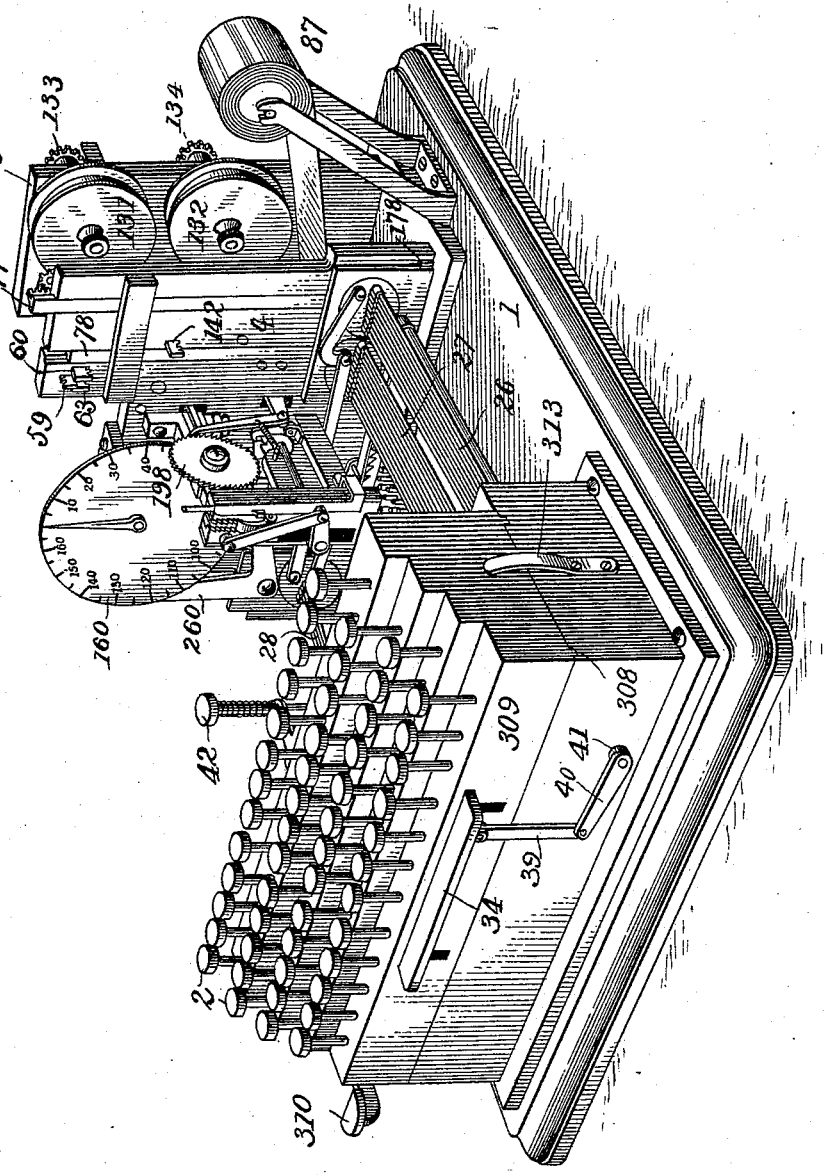

(No Model.) 14 Sheets—Sheet 1.

F. A. JOHNSON.
MANUFACTURE OF CONTROLLERS FOR COMPOSING MACHINES.

No. 536,149. Patented Mar. 19, 1895.

Witnesses
Robert Heatson
Will E. Neff

Inventor
Frank Amos Johnson
By J. T. Watson
Attorney (No Model.) 14 Sheets—Sheet 2.

F. A. JOHNSON.
MANUFACTURE OF CONTROLLERS FOR COMPOSING MACHINES.

No. 536,149. Patented Mar. 19, 1895.

Witnesses
Robert Watson
Will E. Neff

Inventor Frank Amos Johnson
By J. A. Watson, atty.

(No Model.) 14 Sheets—Sheet 3.
F. A. JOHNSON.
MANUFACTURE OF CONTROLLERS FOR COMPOSING MACHINES.
No. 536,149. Patented Mar. 19, 1895.

Witnesses
Robert Watson
Will E. Neff

Inventor
Frank Amos Johnson
By F. H. Watson, atty.

(No Model.) 14 Sheets—Sheet 4.
F. A. JOHNSON.
MANUFACTURE OF CONTROLLERS FOR COMPOSING MACHINES.
No. 536,149. Patented Mar. 19, 1895.
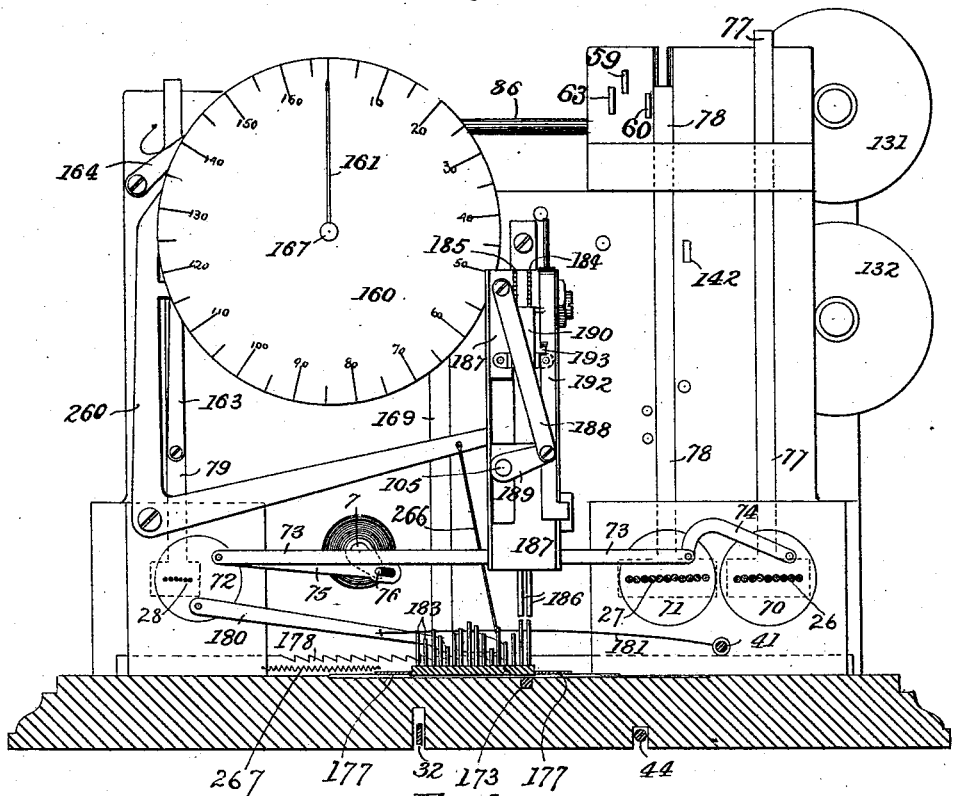
Fig. 4.
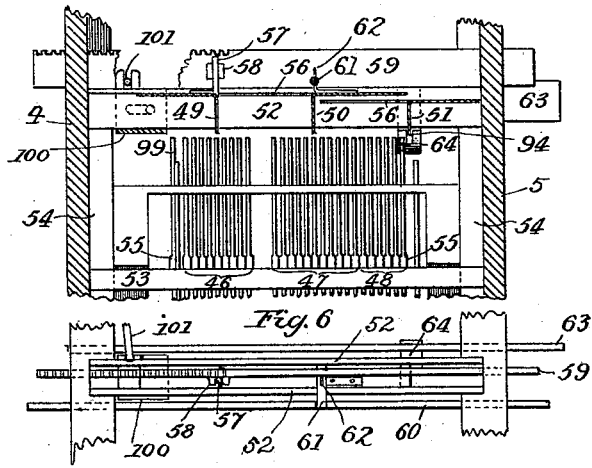
Fig. 5.
Fig. 6.
Witnesses
Robert H. Watson
Will E. Neff
Inventor
Frank Amos Johnson
By J. H. Watson, atty.

(No Model.)　　　　　　　　　　　　　　　　14 Sheets—Sheet 5.
F. A. JOHNSON.
MANUFACTURE OF CONTROLLERS FOR COMPOSING MACHINES.
No. 536,149.　　　　　　　　　Patented Mar. 19, 1895.

Witnesses
Robert H Watson
Will E. Neff

Inventor
Frank Amos Johnson
By J. H. Watson, atty.

(No Model.) 14 Sheets—Sheet 6.
F. A. JOHNSON.
MANUFACTURE OF CONTROLLERS FOR COMPOSING MACHINES.
No. 536,149. Patented Mar. 19, 1895.

Witnesses
Robert Watson
Will E. Neff

Inventor
Frank Amos Johnson
By J. H. Watson, atty.

(No Model.)  F. A. JOHNSON.  14 Sheets—Sheet 7.

MANUFACTURE OF CONTROLLERS FOR COMPOSING MACHINES.

No. 536,149.   Patented Mar. 19, 1895.

Witnesses
Robert Watson
Will E. Neff

Inventor
Frank Amos Johnson
By J. A. Watson, atty.

(No Model.)
14 Sheets—Sheet 8.
F. A. JOHNSON.
MANUFACTURE OF CONTROLLERS FOR COMPOSING MACHINES.
No. 536,149. Patented Mar. 19, 1895.
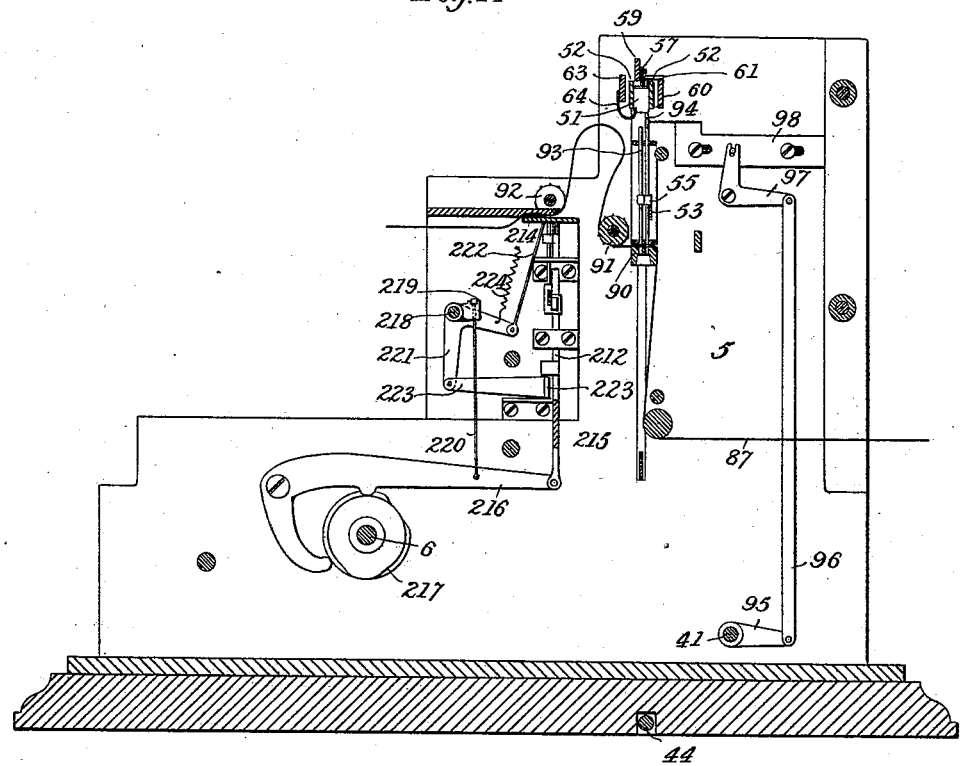
Fig. 14
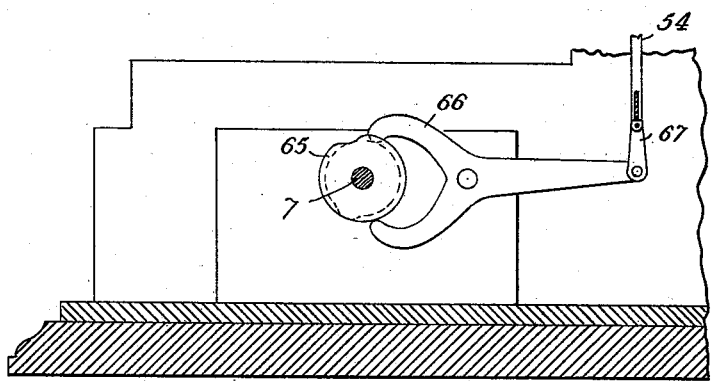
Fig. 15
Witnesses
Robert H. Watson
Will E. Neff
Inventor
Frank Amos Johnson
By J. H. Watson, atty.

(No Model.)

F. A. JOHNSON.

MANUFACTURE OF CONTROLLERS FOR COMPOSING MACHINES.

No. 536,149.

14 Sheets—Sheet 9.

Patented Mar. 19, 1895.

*Fig. 16.*

Witnesses
Robert Watson
Will E. Neff

Inventor
Frank Amos Johnson
By J. A. Watson, atty.

(No Model.) 14 Sheets—Sheet 10.
F. A. JOHNSON.
MANUFACTURE OF CONTROLLERS FOR COMPOSING MACHINES.
No. 536,149. Patented Mar. 19, 1895.

Witnesses
Robert Watson
Will E. Neff

Inventor
Frank Amos Johnson
By J. H. Watson, Atty.

(No Model.) 14 Sheets—Sheet 11.
F. A. JOHNSON.
MANUFACTURE OF CONTROLLERS FOR COMPOSING MACHINES.
No. 536,149. Patented Mar. 19, 1895.

Witnesses.
Robert Watson
Will E. Neff

Inventor
Frank Amos Johnson
By J. A. Watson, atty.

(No Model.) 14 Sheets—Sheet 12.
F. A. JOHNSON.
MANUFACTURE OF CONTROLLERS FOR COMPOSING MACHINES.
No. 536,149. Patented Mar. 19, 1895.

Witnesses
Robert Watson
Will E. Neff

Inventor
Frank Amos Johnson,
By J. A. Watson, atty.

(No Model.)

F. A. JOHNSON.

MANUFACTURE OF CONTROLLERS FOR COMPOSING MACHINES.

No. 536,149. Patented Mar. 19, 1895.

14 Sheets—Sheet 13.

Witnesses
Robert Watson
Will E. Neff

Inventor
Frank Amos Johnson
By J. H. Watson (No Model.)
14 Sheets—Sheet 14.
F. A. JOHNSON.
MANUFACTURE OF CONTROLLERS FOR COMPOSING MACHINES.
No. 536,149. Patented Mar. 19, 1895.
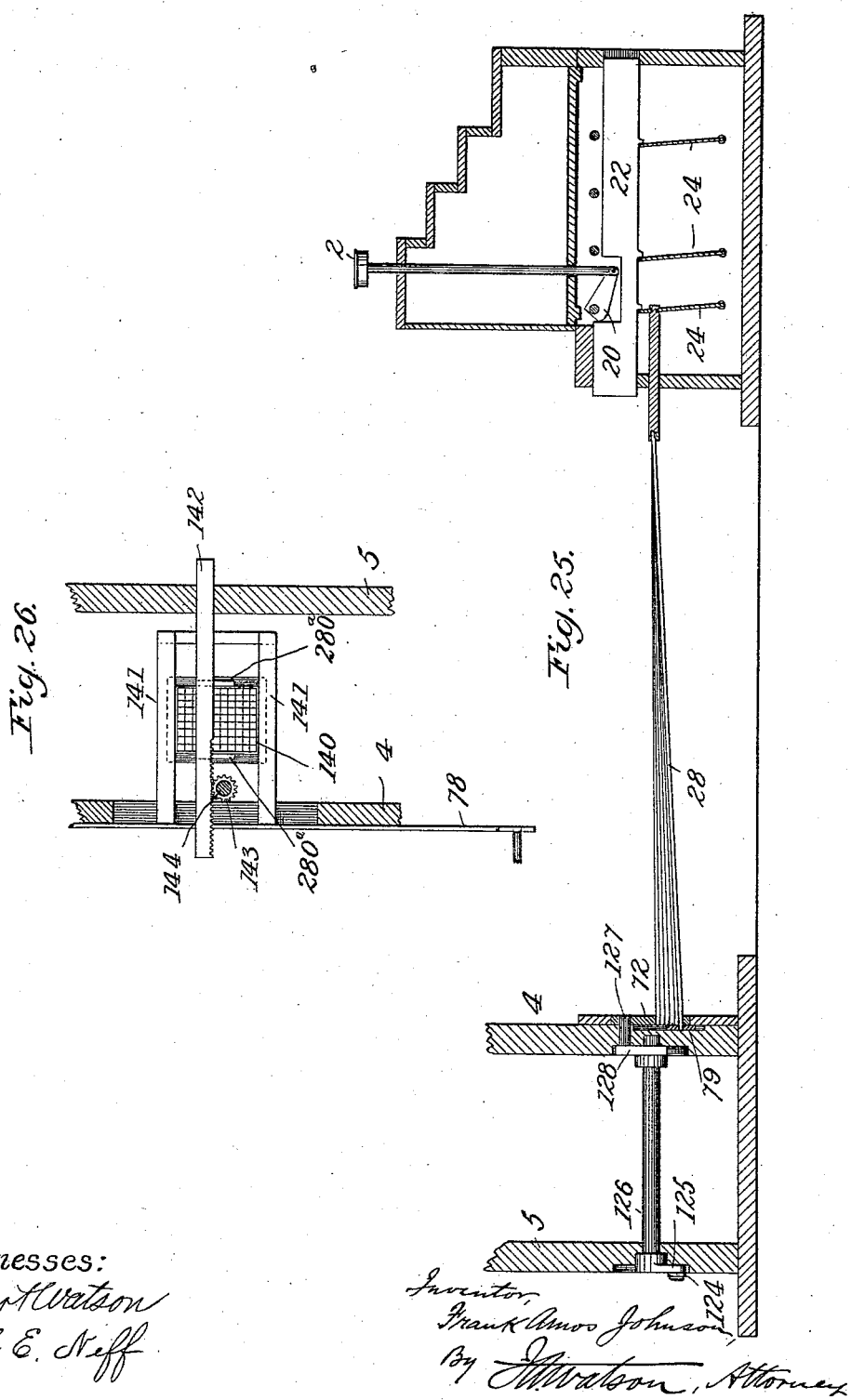

UNITED STATES PATENT OFFICE.

FRANK AMOS JOHNSON, OF PHILADELPHIA, PENNSYLVANIA, ASSIGNOR TO THE TACHYTYPE MANUFACTURING COMPANY, OF MINNEAPOLIS, MINNESOTA.

MANUFACTURE OF CONTROLLERS FOR COMPOSING-MACHINES.

SPECIFICATION forming part of Letters Patent No. 536,149, dated March 19, 1895.

Application filed September 5, 1894. Serial No. 522,210. (No model.)

*To all whom it may concern:*

Be it known that I, FRANK AMOS JOHNSON, a citizen of the United States, residing at Philadelphia, in the county of Philadelphia and State of Pennsylvania, have invented certain new and useful Improvements in the Manufacture of Controllers for Composing-Machines, of which the following is a specification.

My invention relates to improvements in machines for manufacturing mechanical controllers for matrix making, linotype, type casting, and other composing machines; and to an improved method of making the controllers.

A controller for composing machines may consist of a strip of paper or cardboard in which impressions are made by puncturing, perforating or embossing, or it may consist in a metal or wooden plate, strip, roller or cylinder in which movable pins or parts may be set to control the composing machine. The impressions in the paper or cardboard strip or the movable pins or parts in the other controllers enumerated are so arranged, either singly or in groups, as to select in the composing machine the various characters and spaces necessary to produce justified lines of type.

In the following specification, I shall describe my invention as applied in producing a controller consisting of a strip of paper in which the various impressions for controlling the composing machine are made by perforations or groups of perforations. It is to be understood however, that the several features of the invention may, in general, be applied to various forms of controllers and the invention is not to be limited to the particular form adopted for illustration. Furthermore in my improved machine, there are mechanisms or elements which have a wider application, and these features I desire to protect for all purposes to which they may be applicable in the general art. Among such features may be mentioned the justifying mechanism, which may be applied directly to matrix making, type casting, and other composing machines.

The controller illustrated as the product of my improved method and apparatus consists in a strip of paper in which the characters and spaces are represented by perforations or groups of perforations. Each character is represented by two perforations arranged in a transverse line on the paper, and each word space is represented by a single perforation, preferably arranged between the word groups of transverse lines. There are other perforations in the strip, which, in a type casting machine control the width of the mold, and in a matrix making machine or typewriter control the feed of the matrix or paper, for characters of different widths. The perforations representing characters I shall term "character selecting impressions," those representing the spaces which the characters occupy in the line of print, I shall term "character-space selecting impressions" and those representing the spaces between the words I shall term "word-space selecting impressions." The strip is also provided with an imprint of each character placed adjacent to the impressions representing the character, whereby the subject-matter represented upon the controller may be read at sight to determine its signification, and to aid in making corrections, if necessary. The word-space selecting impressions are such as will select proper spaces to justify the lines of print. The strip may therefore be termed a justified and indexed controller.

The method of producing the controller consists in first consecutively forming therein the character selecting impressions for the characters constituting words, leaving out the word space selecting impressions and after the impressions for the words to be included in a line are completed, adding such word space selecting impressions as shall select spaces of proper size to perfectly justify the line. In going over the strip for the first time to form the character-selecting impressions, I insert arbitrary impressions between the words to indicate the location of the word spaces. These impressions I call "trip" impressions for the reason that they are useful to trip or control the second impression device which produces the word space impressions. The trip impressions may be omitted in some instances and the second impression device controlled in a negative manner by the absence of any word space impressions. I also insert character-space selecting impressions if the controller is to be used upon a type casting or matrix making machine. If for a type setting machine, the character-spaces will be regulated by the type bodies and these impressions may be omitted. In addition to the above the end of each line is indicated by a "line" impression.

My improved machine for preparing controllers is provided with a series of keys or character-selecting devices, means for feeding the strip of paper, and an impression mechanism, controlled directly by the keys, for making the character-selecting impressions and, if desired, the character space selecting impressions. A type-writer to index the character-selecting impressions is preferably operated simultaneously by mechanism controlled by the keys. An indicator to show when the lines are full is also operated simultaneously and a justifying device is set at the end of each line in accordance with the total amount of character space in the line, and the number of word-spaces. The justifying device, in turn, sets or controls a second impression device which produces word-space selecting impressions suitable for justification. Each time a space key is struck a trip impression is made to indicate the word-space. This impression, may, if desired, be omitted and the word-space simply indicated by a blank portion of the strip between the word impressions. At the end of each line a "starting" key is depressed which produces an impression indicating the division into lines, and at the same time operates the justifier and starts the mechanism for making the word-space impressions.

I shall now proceed to describe one embodiment of the invention, reference being had to the accompanying drawings, in which—

Figure 2:
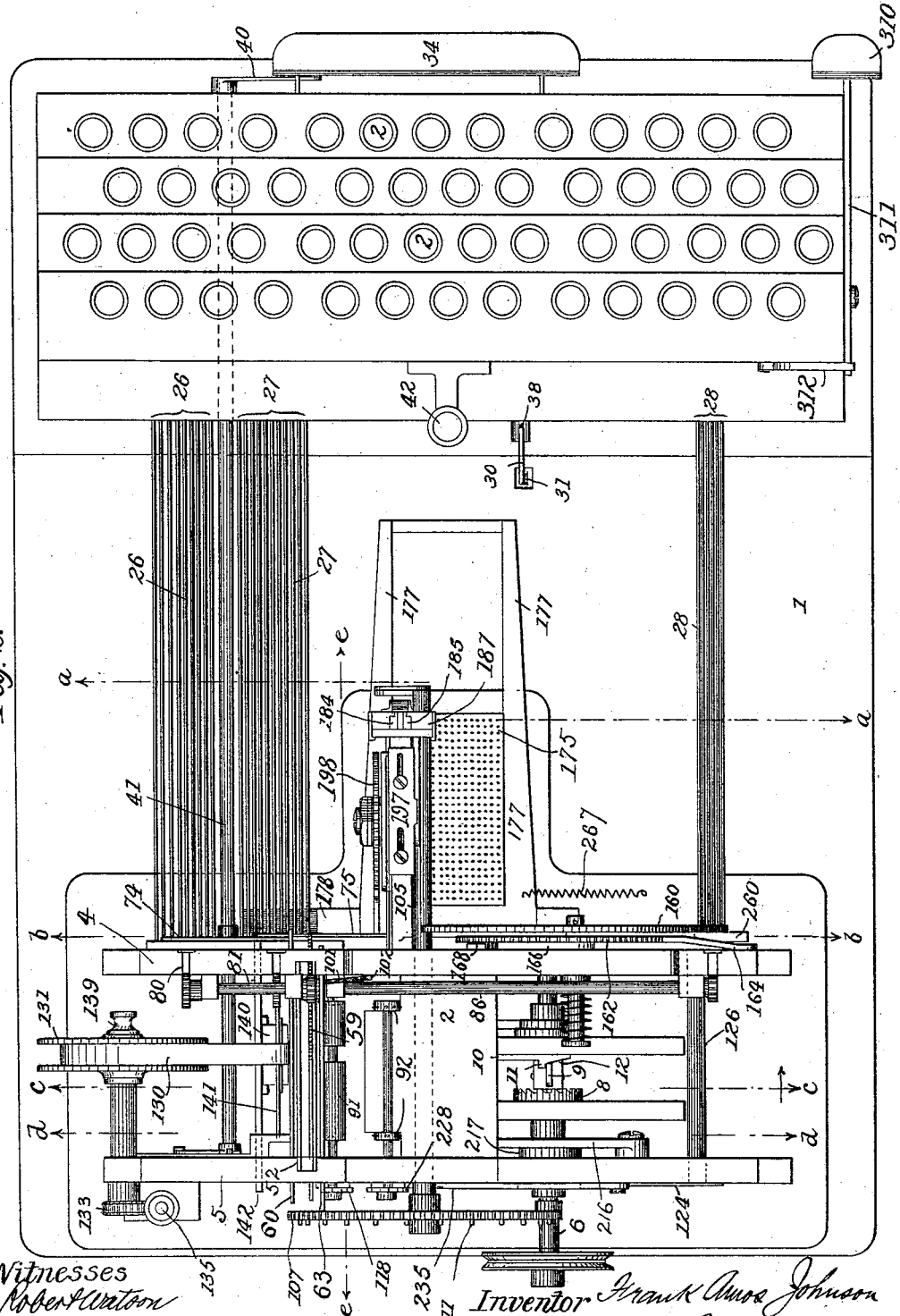
Figure 3:
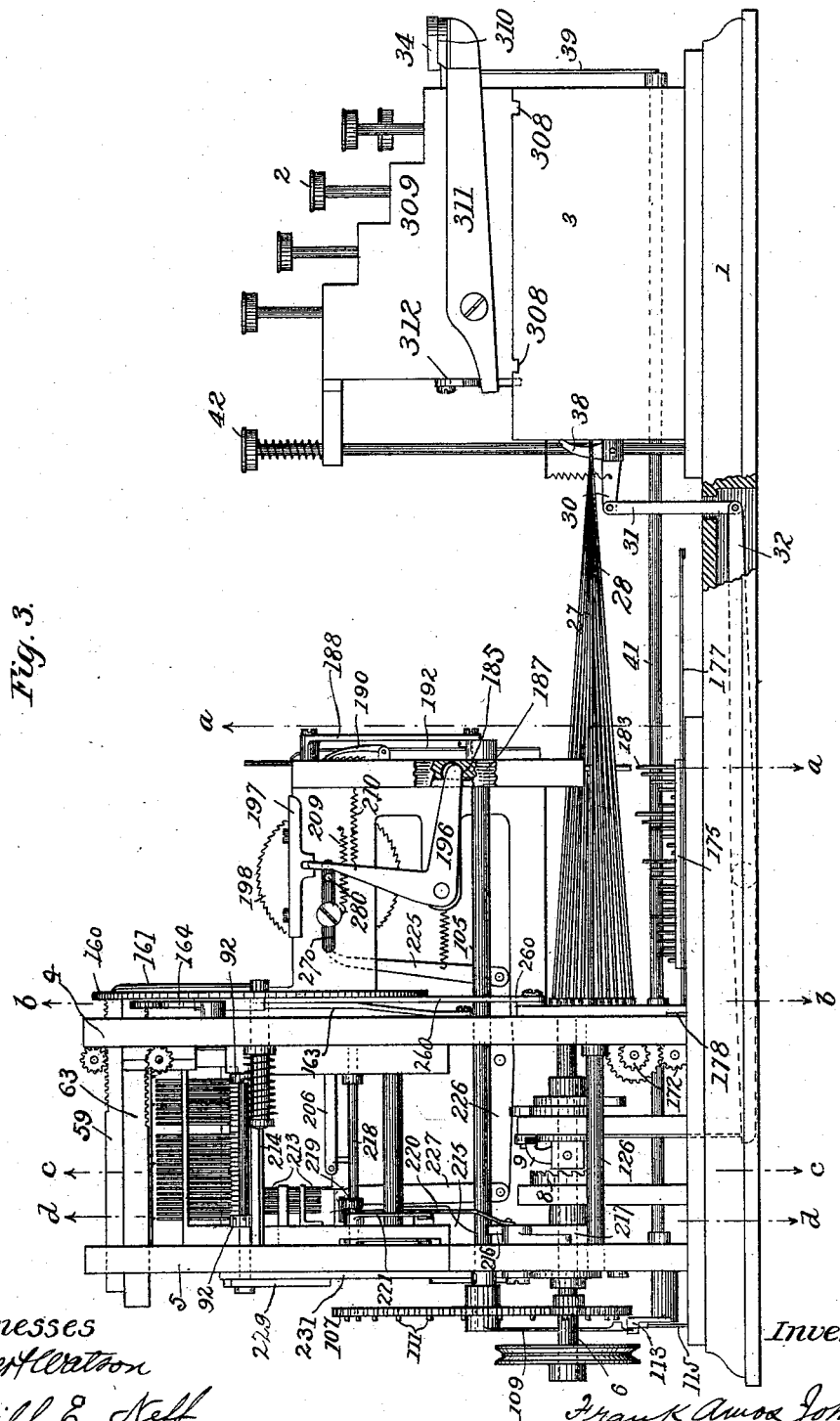
Figure 7:
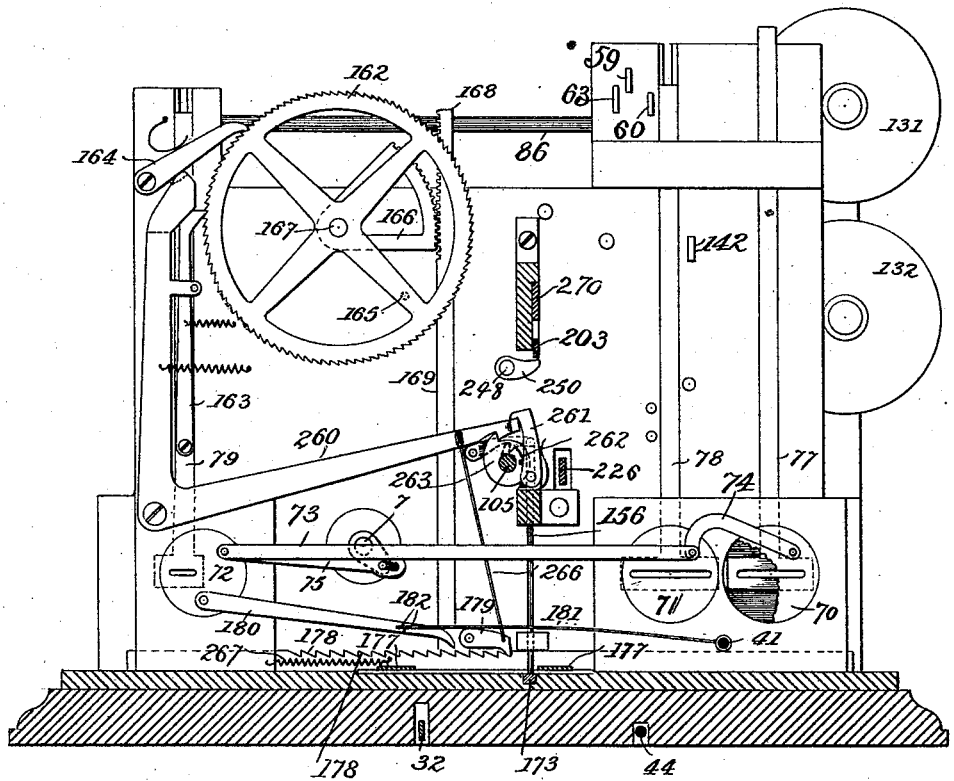
Figure 8:
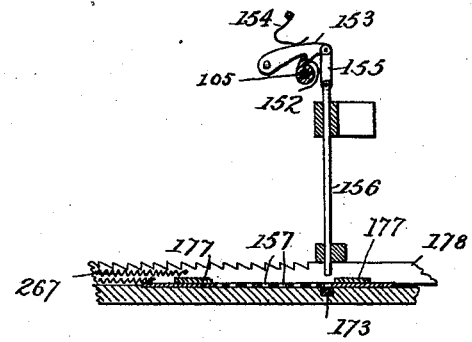
Figure 9:
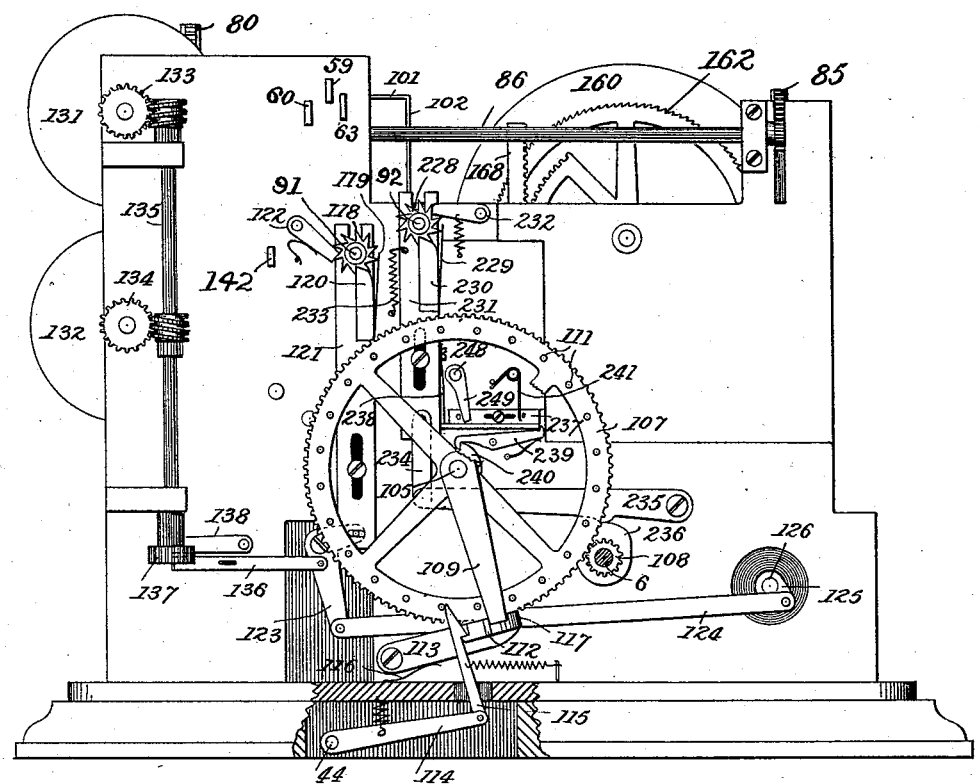
Figure 10:
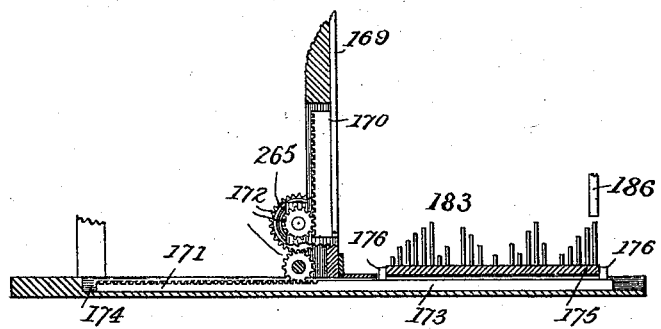
Figure 11:
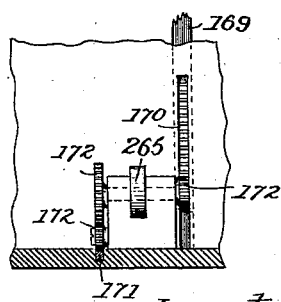
Figure 12:
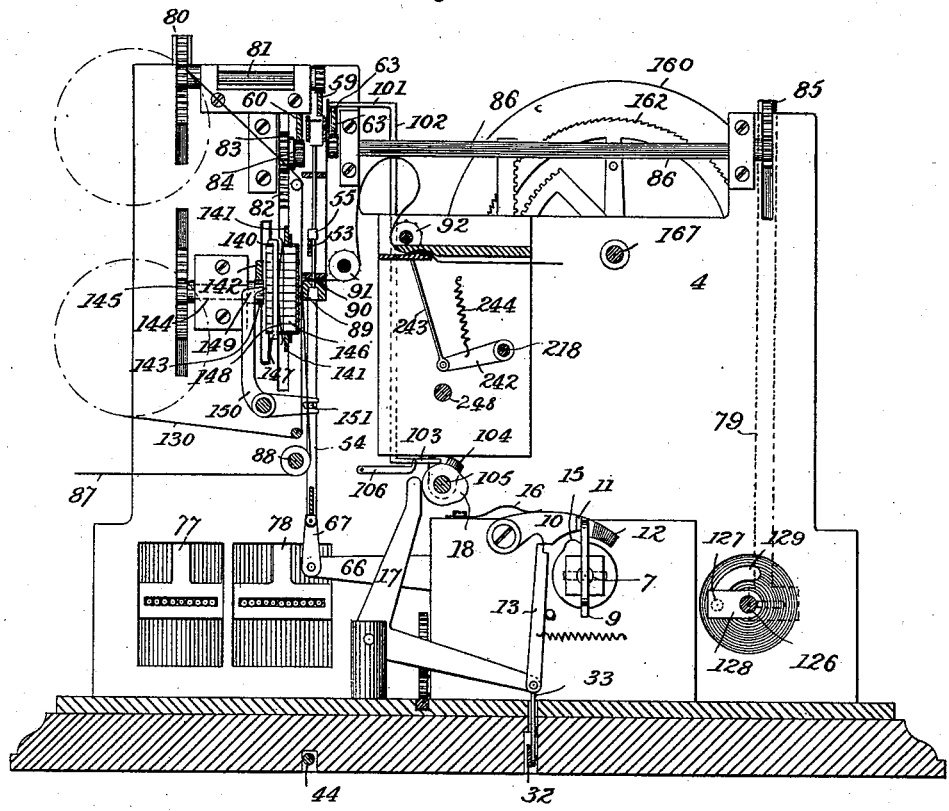
Figure 13:
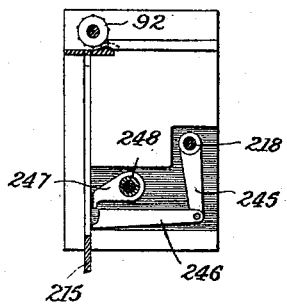
Figure 17:
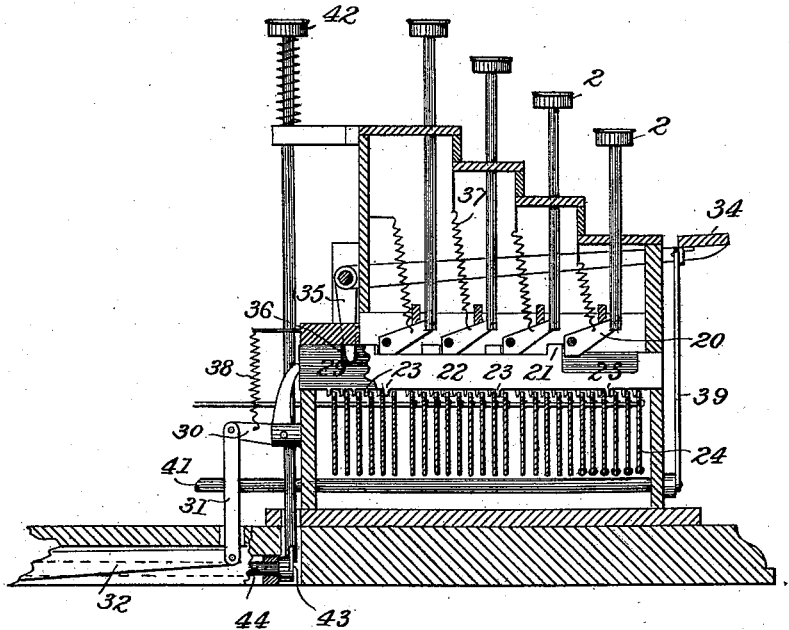
Figure 18:
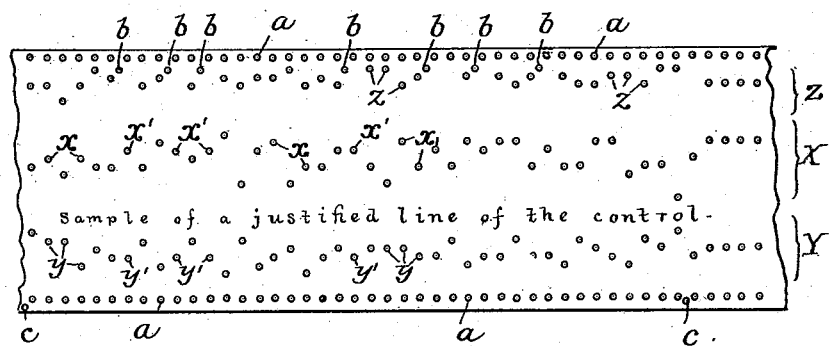
Figure 20:
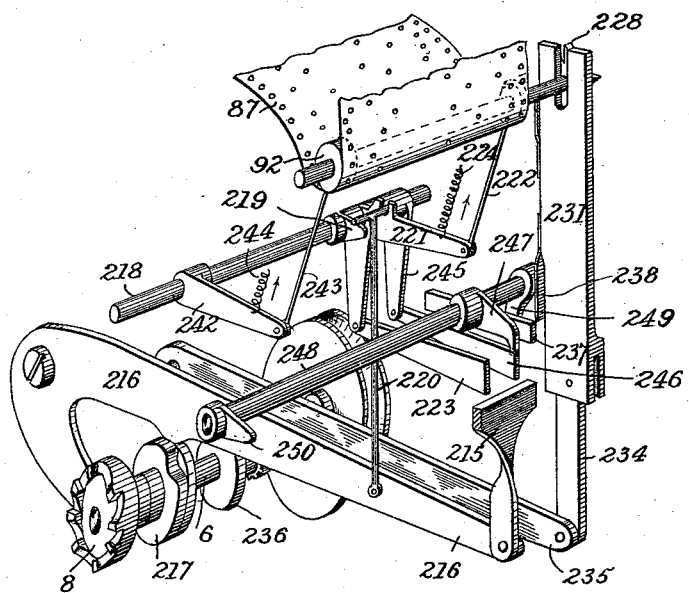
Figure 19:
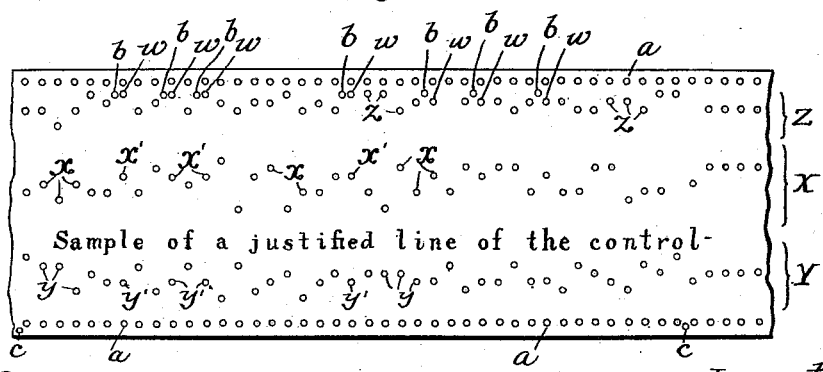
Figure 21:
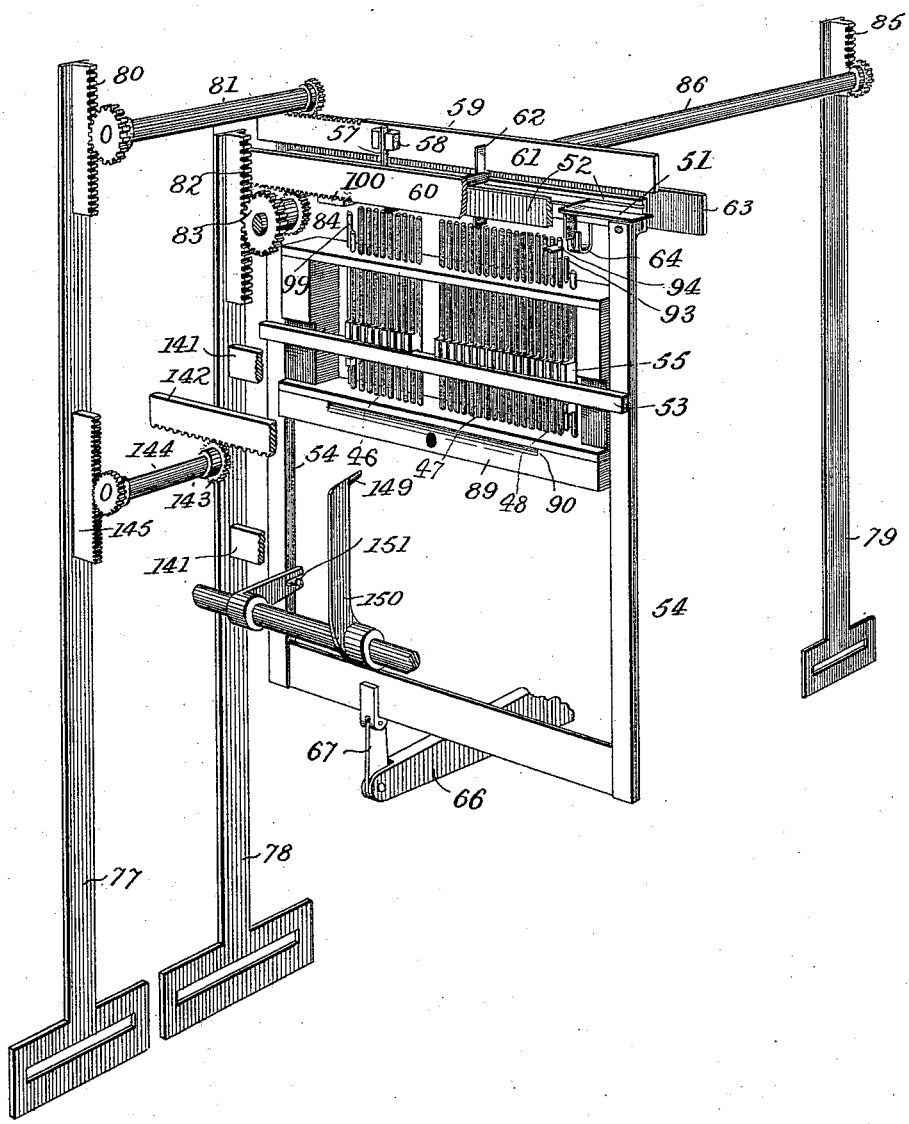
Figure 22:
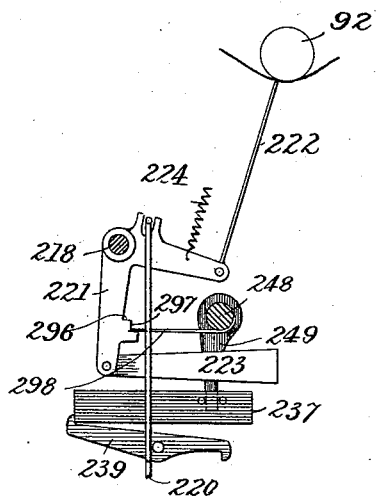
Figure 23:
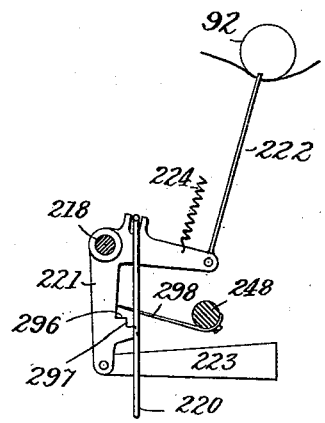
Figure 24:
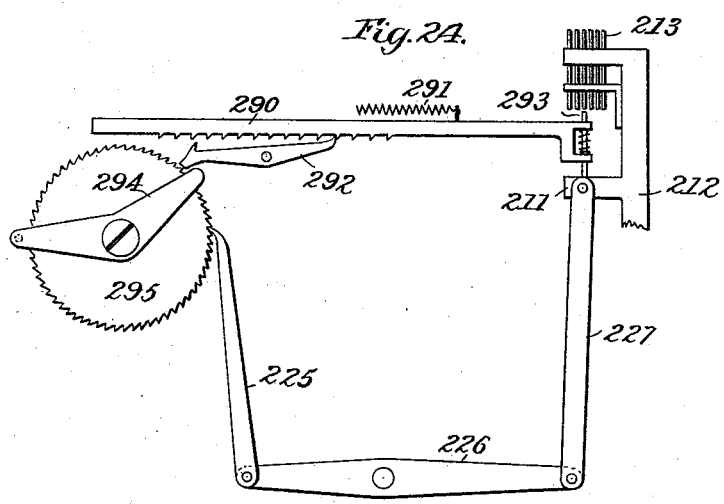

Figure 1 is a perspective view of a complete machine. Fig. 2 is a plan view of the same. Fig. 3 is a left side elevation showing key depressed and disks turned. Fig. 4 is a section on the lines $a$—$a$ of Figs. 2 and 3.
Fig. 5 is a large reverse view of the punches shown in the upper part of Fig. 3. Fig. 6 is a detail plan view of the racks carrying the interponents. Fig. 7 is a section on the lines $b$—$b$ of Figs. 2 and 3. Fig. 8 shows the device for locking the justifier key piece. Fig. 9 is a rear elevation of the machine, part of the frame being broken away. Figs. 10 and 11 are details showing the connections between the dial and justifier key piece. Fig. 12 is a sectional elevation on the line $c$—$c$ of Fig. 3. Fig. 13 is a detail showing the interponent for stopping the feeding device for the second feed roll. Fig. 14 is a sectional elevation on the line $d$—$d$ of Figs. 2 and 3.
Fig. 15 shows the cam and lever for operating the striker frame. Fig. 16 is a sectional elevation on the line $e$—$e$ of Fig. 2. Fig. 17 is a section through the key-board. Figs. 18 and 19 are views of the controller strip, the latter view showing the word-space selecting impressions, and the former being simply provided with the character and character-space selecting impressions. Figs. 20 and 21 are perspective views of portions of the mechanism separated from the main frame. Figs. 22 and 23 are views illustrating the stop mechanism for holding feelers of the word-space impression device out of action while said device is at rest. Fig. 24 is a view of a modified form of mechanism for controlling the word-space impression device. Fig. 25 is an elevation of the type holder and the yokes and slides for moving the same, and Fig. 26 is a partial vertical section taken on the line of the shaft 126.
Referring first to Figs. 18 and 19 of the drawings, X represents a longitudinal section of the strip embracing nine lines in which word-selecting impressions $x$ may be made, and Y represents a longitudinal section embracing eleven lines in which character selecting impressions $y$ may be made. There are therefore ninety-nine possible combinations which may be formed by two impressions $x$—$y$ arranged on a transverse line of the strip; or in other words, the strip as shown, may be made to select any one of the ninety-nine different characters. In a third longitudinal section Z of the strip are six lines upon which space selecting impressions $z$ are made. As illustrated a single perforation $z$ placed in a transverse line will select a space, the position of the impression determining in the composing machine the width of the space, which, as shown, may be from one to six units.
In preparing a controller for type casting or matrix making machines, a space selecting impression is placed in the transverse line of each pair of character-selecting impressions for the purpose of controlling the width of the mold to correspond with the character in the former class of machines and for controlling the matrix feed in the latter. In a controller for type setting machines, however, these character space-selecting impressions may be omitted.

When the controller is intended for a type casting and composing machine, a pair of impressions $x'$—$y'$ are inserted at each word-space which will select and place opposite the mold a blank die to close the mold in casting spaces. These impressions, however, may be omitted and other devices substituted in the casting machine which will normally hold the bank of dies with the blank one opposite the mold.

In all cases I first produce character-selecting impressions consecutively for a given line, omitting the word space selecting impressions as shown in Fig. 18 of the drawings. I then determine, preferably by means of the justifying mechanism hereinafter described, the proper widths of the word spaces which would justify the line, and I insert between the words represented on the controller word-space selecting impressions w, as shown in Fig. 19. In going over the strip for the first time to produce the character-selecting impressions, I may also make the usual feed holes a in the margin of the strip, or the strip may be previously prepared with such perforations. I also preferably make after each word a "trip" hole b, which as shown, is placed between transverse lines of holes representing characters and spaces. The function of this trip hole or impression is to indicate the word spaces and to bring into action the second impression mechanism which inserts the word-space selecting impressions w. It will be evident that the trip impressions may be omitted and blanks left in the strip made to control the second impression device; or I may make ordinary space impressions of uniform value between words, such as one unit or three unit impressions, which can be used to control the second or justifying impression device. In preparing the strip, the running space occupied by the characters is counted upon a dial, as in an ordinary typewriter or matrix machine, and when sufficient matter has been run off to form a line, a line hole c is made in the strip. This serves to indicate the lines on the strip and it also controls the line shifting mechanism in matrix making and similar machines, the mechanism for transferring completed lines to the galley in type setting or type casting machines, and the line casting mechanism in linotype machines. In or adjacent to the transverse lines the characters represented by the perforations in said lines are printed as shown in the drawings. A strip thus indexed is very much more convenient and valuable than a strip which is simply perforated, as the indexed strip may be more readily corrected and its printed record is intelligible to unskilled operatives who would have difficulty in translating the impressions alone.

Fig. 18 represents an unjustified controller, and Fig. 19 a justifying controller. In using the latter justified mechanism may be omitted from the composing machine and said machine greatly simplified. The character-spaces and word-spaces, described in the present application, are arranged on the "unit" principle as it is most convenient to arrange for justification under this principle.

I shall first describe my improved machine as it is illustrated in the accompanying drawings which is the best embodiment of the invention at the present time known to me. It is obvious, however, that numerous modifications may be made within the scope and spirit of the invention. The various working parts of the machine are supported upon a base 1. There is a bank of keys 2 at the front of the machine supported in a box or casing 3 and at the rear of the machine are vertical plates or standards 4—5 between or on which most of the working parts are mounted.

The various parts of the machine are power-operated, the power being supplied from a constantly driven shaft 6 (Figs. 9 and 16) which I shall term the "running shaft." In line with this shaft is an "escape shaft" 7 which is normally at rest. A suitable clutch mechanism is provided for engaging the escape shaft with the running shaft when a key is depressed, the clutch being automatically disengaged after the escape shaft has made one complete revolution. As shown, this clutch mechanism consists of a toothed wheel 8 (Figs. 2, 12 and 16) upon the inner end of the running shaft and a pawl 9 upon the adjacent end of the escape shaft. The pawl is normally held out of engagement with the wheel 8 by a lever 10 having a stop or projection 11 and a cam surface 12. The lever 10 is raised periodically by a lifter rod 13 and when it passes above the tail end of the pawl a spring 14 throws the opposite end of the pawl into engagement with the wheel 8. As the escape shaft is carried around the lifter 13 is thrown out of engagement with the stop lever 10 by means of a cam 15, and the stop lever is immediately pressed down by its spring 16 into position to engage the pawl 9 at the end of a single revolution. Each time that a key is depressed, the lifter 13 is raised and the escape shaft is permitted to make one revolution, as will be presently described.

Each of the keys 2 is connected to a short lever 20 which has a shoulder or arm engaging a shoulder 21 upon a slide 22. Each key thus operates a seperate slide 22 and each of the slides is provided with three projections 23 which engage the upper edges of three series of rocking permutation bars 24. The bars 24 extend the entire length of the casing 3 on which the keys are mounted, and to the upper edge of each bar is connected by a swiveled joint a rod or wire. These rods or wires are arranged in three groups respectively marked 26, 27 and 28 (Figs. 1, 2 and 17). The rocking bars are arranged in similar groups, as shown in Fig. 17, and one of the projections 23 engages a bar 24 of each group and thus carries forward a single rod in each of the groups 26, 27, and 28.

A slide 29 has teeth or projections 23 which engage all of the permutation bars 24 so that when any one of said bars is rocked, the slide 29 will be thrown to the rear. This slide operates through elbow lever 30, link 31, lever 32, and link 33 (Figs. 3, 12 and 17) to raise the lifter 13, which operates the clutch mechanism and engages the escape shaft with the running shaft. The space-key 34 also operates the common slide 29 through the medium of an elbow lever 35 which engages a shoulder 36 on the slide. The keys are returned by means of springs 37 and the permutation bars and slides are returned by spring 38 (Fig. 17) which returns the common slide 29. The space key is connected by means of link 39 and arm 40 with a rock shaft 41 (Figs. 1, 3 and 17) the function of which will be hereinafter mentioned. In the rear of the bank of keys is a line or starting key 42 which is connected by an arm 43 to a rock shaft 44 extending to the rear of the machine, which will also be referred to hereinafter.

The controller strip as before described has three longitudinal sections, two in which the character selecting impressions are made, and a third for space impressions. There are in the machine punches arranged to make perforations in these different sections of the strip (Figs. 3, 5, 6 and 14). As shown, there are three main groups of punches 46, 47 and 48 corresponding with the groups of rods 26, 27 and 28 and with the groups of permutation bars. The punches 46 and 47 make the character selecting impressions and the punches 48 the space-selecting impressions. The punches of the different sets are driven respectively by interponents 49, 50 and 51 carried by the upper bars 52 of a striker frame (Fig. 5). This frame has a bar 53 connected to it by uprights 54. The punches have square shoulders 55 which rest upon the bar 53 and the punches which are driven down to perforate the paper are returned by the bar 53 as the striker frame rises. The striker frame is quickly depressed and raised again by means of a double cam 65 and forked lever 66 which is connected to the striker frame by a link 67 (Figs. 12 and 15). Each of the interponents has a sliding movement in guide grooves 56 in the inner sides of the upper bars 52 of the striker frame, its range of movement extending over the punches of its series. As shown, the interponent 49 is provided with an upwardly projecting pin 57 which is engaged by studs 58 upon a sliding rack bar 59 (Figs. 5, 6, 12 and 14). A second rack bar 60 has an arm 61 which engages a pin 62 in the interponent 50; and a third rack bar 63 has a curved arm 64 which engages the lower edge of the interponent 51. Each time a character key is depressed, the interponents are placed over the punches corresponding to the character and character-space and are then driven by the striker, making perforations in the paper.

I shall now describe the mechanism for placing the interponents. As heretofore stated, when a character-key is depressed, a rod in each of the groups 26, 27 and 28 is pushed rearward. The rear ends of the rods in groups 26, 27, lie in diametrical slots in disks 70 and 71 respectively (Figs. 4, 7 and 12). The rear ends of the rods of group 28 lie in a radial slot of disk 72. These disks 71 and 72 are connected by rods 73 and 74 and they are rocked a quarter revolution at each turn of the escape shaft 7 by a connecting link 75. A crank pin 76 engages a slot in the link 75 which slot permits the disks to remain stationary a moment before being returned to their normal positions with their grooves horizontal. In the rear of the disks 70, 71 and 72 are T-slides 77, 78, and 79 respectively which have horizontal slots in their heads opposite the slots in the disks when the latter are in their normal or horizontal positions. The T-slide 77 has a rack 80 at its upper end (Fig. 12) which communicates motion to the interponent rack 59 through the medium of shaft 81 and pinions engaging the racks. The T-slide 78 has a rack 82 at its upper end which communicates motion to the interponent rack 60 through pinions 83 and 84, and the rack 85 at the upper end of the T-slide 79 communicates motion to the interponent rack 63 through a shaft 86 and suitable pinions.

The strip of paper 87 to be perforated enters at the right of the machine, passes around a guide roller 88 and over a platen 89 at which point the characters are imprinted upon it by a typewriter, (Fig. 12.) It then passes over a die plate 90 having perforations corresponding with the punches, then under a feed roll 91 and lastly under a feed roll 92 and through a second impression device which will be hereinafter described.

The operation of the mechanism thus far described is as follows: When a key in the key-board is depressed, it operates through the medium of the slides 22 and permutation bars 24 to move rearward a rod in each of the groups 26, 27, 28. The rear ends of these rods lie normally in front of the T-slides 77, 78, and 79 and when pushed rearward, the ends of the rods project in the slots of these T-slides, (Fig. 25.) When the ends of the rods thus enter the T-slides the escape shaft is set in motion through the common slide 29 and the connections 30 to 33 inclusive (Figs. 3, 12 and 17). These connections raise the lifter 13 and render the clutch operative thus producing one revolution of the escape shaft. As the escape shaft revolves, the disks 70, 71, and 72 are given a quarter of a revolution by means of the connections 73, 74 and 75 (Figs. 4 and 7), and the slots into which the pins project are revolved into a vertical position, in which position they remain for a moment stationary while the pin 76 moves along the slot in the link 75. The disks are then returned to their normal positions with their slots horizontal. It will be apparent that the ends of the rods projecting into the slots in the T-slides constitute crank pins and that the slides will be moved vertically as the disks are rocked a distance equal to the distance of the projected rod from the center of the disk, or in other words, equal to the radius from the center of the disk to the projected crank pin. The T-slides 77 and 78 are moved upward or downward from their normal positions according as the projected rods lie on the right or left of the centers of the disk. As shown in the drawings, there are central rods and if these are projected, no movement will be given the T-slides. As the rods of the group 28 all lie to the left of the center of the disk 72 the T-slide 79 will in all cases be moved downward when the disk is rocked and then returned to its normal position. As above stated, the various rods of the groups 26, 27 and 28 have swivel connections with the permutation bars, and the rear ends of each group may therefore be turned so as to lie in a vertical line while the forward ends remain in a horizontal plane. The movements of the T-slides are communicated through the pinions, shafts and racks described to the several interponents 49, 50, 51, and at the extreme points of movement of the T-slides the interponents stand over the punches corresponding to the character of the key which was depressed. At this moment the striker frame is depressed by the cam 65 and the punches are driven into the paper, the character and its space being thus represented by the three perforations produced.

The perforations made by the groups of punches 46, 47 and 48 are indicated in Figs. 18 and 19 respectively by the characters $x$, $y$ and $z$. The perforations $b$ or "trip" impressions are made by a special punch 93 (Figs. 14 and 21) which is at the left of one of the space punches 48. Over the punch to the right of the punch 93 there stands normally an interponent 94 which is interposed between said punch and the interponent 51 which drives the space punches. When the space key is depressed, the shaft 41 is rocked and through arm 95, link 96 and elbow lever 97, the slide 98 which carries the interponent 94 is thrown to the left and held over the punch 93 while the striker descends, thus producing a trip hole $b$ in the strip instead of a space hole $z$. The position of the trip hole is arbitrarily chosen, and it is not absolutely essential that it should go between the transverse lines in which the other perforations are made. It might be located in these lines if desired.

The line holes $c$ which are shown in Figs. 18 and 19 are produced by a special punch 99 operated by an interponent 100 which is shifted by an arm 101 upon a vertical rock shaft 102 (Figs. 2, 5, 9 and 12). The rock shaft 102 has on its lower end an arm 103 which is released each time the starting key 42 is depressed by a cam 104 upon the starting shaft 105, and the shaft is rocked by a spring 106. The return movement is given to the rock shaft by the cam 104.

The starting shaft 105 is normally at rest but is given one complete revolution at the end of each line by the following mechanism: Upon the rear end of the starting shaft is a gear wheel 107 which is loose on the shaft and rotates continuously by virtue of its engagement with a pinion 108 upon the running shaft 6. A clutch mechanism, which may be of any suitable construction engages the gear 107 with the starting shaft and it is automatically disengaged when the shaft has made a complete revolution. The construction of the clutch illustrated in the drawings (Figs. 2, 9 and 16) is as follows: A spring arm 109 is fixed upon the shaft 105 and a tooth 110 upon its outer end tends to spring into engagement with one of a series of pins 111 upon the face of the gear 107. The arm is normally held away from the pins upon the gear by a stop 112 upon a lever 113. When the starting key is depressed, the shaft 44 is rocked as heretofore explained, and an arm 114 at the rear end of the shaft draws down a hook 115, and the stop lever 113 thus releases the arm 109 which springs into engagement with the pin on the revolving gear 107 thus carrying the arm 109 and the starting shaft around with the gear. As the arm 109 starts it throws the hook 115 out of engagement with the stop lever 113, and said lever is immediately thrown up by its spring 116 into position to intercept the arm 109 after a complete revolution. A cam 117 upon the end of the stop lever draws the spring arm out of engagement with the gear 107 and the starting shaft remains stationary until the starting key is again depressed.

The devices for turning the feed roll 91 which feeds the strip over the die 90 and platen 89 are as follows: Upon the shaft of the roll 91 is a star wheel 118 (Figs. 2 and 9). This wheel is fed forward one tooth at a time by means of a spring pawl 119 and rigid pawl 120 upon a slide 121. When the slide is vertically reciprocated, the spring pawl engages a tooth and starts the star wheel forward and the rigid pawl immediately afterward engages the wheel and completes its movement and afterward locks it. A holding pawl 122 prevents any backward movement of the feed roll. The slide 121 is reciprocated each time a key is depressed through the medium of bell crank 123, connecting rod 124 and a crank 125 upon the rear end of shaft 126 which is rocked by a crank 128 upon its forward end which is connected by a crank pin 127 with the rocking disk 72 (Figs 3, 4, 9, 12 and 25). The pin 127 extends through a slot 129 in the plate or standard 4.

130 indicates the ink ribbon of the typewriter device which is alternately wound onto bobbins 131 and 132. These bobbins are mounted on shafts provided with worm gears 133 and 134 which are driven in opposite directions by worms upon a shaft 135. This shaft is intermittently driven by a pawl 136 (Fig. 9) which engages the ratchet wheel 137. This pawl 136 is connected with the elbow lever 123 which operates the slide 121. The holding pawl 138 prevents backward movement of the shaft 135. The spools are loose upon the shafts 131 and 132 and they may be alternately clamped to said shafts by thumb nuts 139. The details of this ribbon feeding mechanism are not of my invention and need not be more fully described.

As shown in the drawings, the typewriter by means of which the strip is indexed is constructed and operated in the following manner: The die carrier 140 is mounted with freedom to slide back and forth in a yoke consisting of a pair of arms 141 attached to the T-slide 78 (Figs. 2, 12 and 26). The type-carrier is moved horizontally in the yoke 141 by means of a second yoke 280ª which embraces the carrier and is connected with the rack 142 which latter is operated by a pinion 143 upon a shaft 144 which is periodically rocked by a rack 145 upon the T-slide 77. The type carrier is provided with type 146 arranged in rows in two directions. The type of each pair of rows are held in position by a bar 147 and a spring 148 which extend through grooves in the type. It will be seen that the type carrier is tied to the T-slides so that its vertical movements are the same as those of the bar 78 and its horizontal movements correspond to the vertical movements of the bar 77. When a key is depressed therefore, the type carrier is moved so as to bring the corresponding type opposite the printing point and in front of a hammer 149 which is upon one end of an elbow lever 150. The opposite end of this elbow lever engages a pin 151 upon the striker frame and each time that the striker is depressed to perforate the paper strip, the type corresponding to the key operated will be struck by the character and imprinted upon the paper. The ink ribbon 130 passes between the type and paper strip in the usual manner.

The mechanism so far described will produce the unjustified strip shown in Fig. 18 of the drawings.

It now remains to produce word-space-selecting impressions, such as are marked $w$ in Fig. 19, adapted to select proper word spaces to justify the line of print. This remaining operation is performed by a justifying mechanism and a second impression or perforating mechanism which is set or controlled by the justifying mechanism. So far as the mechanism heretofore described and my improved controller strip and the method of making it are concerned, it is immaterial what form of justifier is employed for making or controlling the positions of the word-space impressions in the strip. I prefer however, to use the novel justifying mechanism illustrated in the drawings on account of its simplicity and the uniformity of the results obtained. This justifier operates upon what I term the "quotient and remainder" principle.

One or two illustrations will perhaps best define the meaning of the term "quotient and remainder" which I believe I am the first to apply to justification. The total word space is equal to the length of a line minus the space occupied by the characters in the line. If in a given line the total word-space is twenty units and there are five word spaces in the line, the individual word-spaces will be the quotient of twenty divided by five, or four units each, in which case there would be no remainder. If, however, the total word space were twenty units and there were six individual word-spaces in the line the quotient would be three units with a remainder of two units. In this latter case there would be four three units or quotient word-spaces and two four unit or quotient-plus-remainder word-spaces. In all cases when there is a remainder, I distribute it over as many word-spaces as there are units of remainder, increasing each of such word-spaces by one unit. In this manner any line of print may be perfectly justified with a difference of not more than one unit between any two of the word-spaces and this difference is immaterial so far as the appearance of the composed matter is concerned. In operating the keyboard, care should be taken to allow for normal word-spaces, but even if the total word-space is insufficient to make all the individual spaces of normal size the justification will be effected by my improved mechanism in the manner above stated. Suppose for instance, the total word space is only four units and there are five word spaces. In this case, the quotient would be zero and the remainder would be distributed as usual in the proportion of one unit to each of four of the word-spaces while the fifth word-space would be the quotient space or zero. In all cases, the total word-space will be distributed throughout the several word spaces evenly if there be no remainder, and with but a single unit difference between any two of the spaces if there be a remainder.

I shall now proceed to describe, first, the mechanism by which the character and space-keys operate or set the justifier; secondly, the justifier proper, and, thirdly, the manner in which the word-space impression device is controlled by the justifier.

The character spaces and normal word spaces are registered upon a fixed dial 160 by a pointer 161. The pointer is upon the shaft of a ratchet wheel 162 (Figs. 1, 2, 4 and 7) which is preferably provided with teeth corresponding in number to the total number of units in a line of print. This ratchet wheel is fed forward by a pawl 163 connected with the T-slide 79 which operates the space interponent. A holding pawl 164 prevents backward movement of the ratchet wheel. A pin 165 upon the rear of the ratchet wheel engages a sector gear 166 which is mounted on the shaft 167 independently of the ratchet wheel. The gear is engaged by the pin during the latter part of the movement of the ratchet wheel, that is, when the line is nearly filled, and the sector is carried forward more or less according to the amount of matter in the line. The sector gear is in mesh with a rack 168 upon a slide 169. At the lower end and in the rear of slide 169 is a second rack 170 (Figs. 10 and 11) which imparts movement to a horizontal rack 171 through a train of gears 172. The rack 171 is upon the rear end of a slide 173 which runs in a groove 174 in the bed of the machine. The pawls 163 and 164 are disengaged from the ratchet wheel at the end of each line by a lever 260 as will be described hereinafter.

A feature of the quotient and remainder justifier is what I shall term a "key-piece." As shown, the body of the key-piece consists of a movable plate or block 175 embraced, and free to slide laterally, in a yoke 176 attached to the slide 173 (Figs. 2, 3, 10 and 16). The key-piece is also embraced in a yoke 177 attached to a rack 178 which is movable transversely on the bed-plate of the machine (Fig. 7). The rack 178 is normally held stationary by a pawl 179 and it is moved one step each time the space key 34 is depressed by means of a pawl 180 which is connected to the disk 72 (Figs 4 and 7). The pawl 180 moves back and forth each time the escape shaft operates but it is normally held above and free from the rack 178 by an arm 181 which slides between two pins 182 upon the pawl. The arm 181 is attached to the rock-shaft 41 of the space-key and each time the space-key is depressed and the shaft rocked the pawl 180 is lowered into engagement with the rack 178 and simultaneously it is moved forward and the rack 178 is carried one step to the right and retained there by the holding pawl 179 (Figs. 3, 4, and 7). The key-piece is provided with a series of keys 183 arranged in rows upon the plate 175, which keys in the present case each consists of a pair of pins fixed in and projecting upward from the plate or base of the key-piece. There are as many keys or pairs of pins 183 as there are possible variations in the spacing of different lines. One pin of each key indicates in the present instance the quotient spaces of a given line, and the other pin represents the quotient-plus-remainder spaces; or in other words, one part of each key controls the distribution of the quotients and the other key controls the distribution of the remainder through the word spaces of a line. The keys, are preferably arranged as shown in the drawings, in a series of parallel lines upon the base of the key-piece. The key piece is moved in one direction a number of steps equal to the number of word-spaces in a line by the connections with the word-space key above described and it is moved in the other direction, or at right angles, an amount equal to the space occupied by the characters in a line, or, if desired, to an amount equal to a space occupied by the characters plus normal word spaces, this movement being effected from the indicator ratchet wheel by the connections described. The key-piece is used to set a pair of slides 184, 185, which have feet 186 which are lowered, at the end of each line, to be set by the key corresponding to that line (Figs. 1, 2, 3, 4, and 16). As above stated, there is a separate key in the key-piece for each different combination of total word-space and number of word-spaces and at the end of each line the key-piece is positioned so that the particular key corresponding to the total word-space and number word-spaces of that line is under the slides 184, 185. The starting key is then depressed and during the rotation of the starting shaft, the feet 186 of these slides descend into contact with the key and the slides are thus set from the key, as will be hereinafter more fully explained.

I have applied the word "key" to each of the pairs of pins in the key-piece because of the analogy between these pins and the keys which operate locks. Each key represents a combination adapted for a particular line, and in this respect the key-piece represents a bunch of keys, each adapted to open a particular lock. It will be evident that the only essential feature of a key is that it shall present two surfaces to set the slides above the key-piece. The keys may therefore, be formed of sheet metal and an entire row of keys may be formed in a single piece, or, for that matter, all of the keys might be formed in a block. The bodily movement of the key-piece may be in two directions in a plane, as is shown in the accompanying drawings, or the key-piece may be cylindrical with the keys arranged on its exterior surface, in which case it would have a longitudinal sliding movement upon its axis and a rotary movement, one of these movements being governed by the number of word spaces and the other movement by the amount of matter in the line or by the total character space. The key-piece is susceptible of many variations both as to its construction and its movements, and the individual keys may be varied in construction. In some instances, each key may consist of a single pin or surface. This modification would be adapted to form part of a justifying mechanism operating upon a percentage basis such as that shown in the British Patent No. 1,503 of 1880. In the present instance, in which the justifier operates upon the quotient and remainder principle, it is essential that each key should have two planes or setting surfaces, and also that the key-piece should have two movements, one controlled by the space-key and the other by the character-spacing mechanism.

At each revolution of the starting shaft 105, a slide or carriage 187 which stands normally in a middle position is carried first upward to its upper position, then downward to its lowest position and then upward to the middle or normal position. This slide or carriage carries the setting transfer-slides 184 and 185 and it is connected to the starting shaft by means of a link 188 and crank 189 (Figs. 1 and 4). Upon the carriage 187 is a broad pawl 190 which engages the teeth upon the front edges of the setting transfer-slides 184 and 185. As the carriage 187 descends, a pin 191 upon the pawl 190 engages a switch 192 and the pawl is thus thrown out of engagement with the slides 184 and 185, permitting said slides to drop until their feet 186 are in contact with the key below. At this moment the pin 191 comes opposite a notch 193 in the switch 192 and the spring 194 of the pawl again carries it into engagement with the teeth of the slides 184 and 185 so that as the starting shaft continues to revolve, the slides 184 and 185 will be carried upward and will remain set in the relation to each other in which they were placed by the key 183 of the key-piece.

The slide 185 takes its setting from that portion of the key which may be said to represent the quotient spaces. As this slide rises, it operates an elbow lever 196 (Figs. 3 and 16), the upper arm of which engages and moves a slide 197 and also pin 280 upon the rear of a slide 270. The latter slide carries a ratchet wheel 198, and a stepped sector 199 upon the shaft of the ratchet wheel. Upon the forward end of this sector is a pin 200 in the path of an arm 201 of the slide 184. As the slide rises the arm engages the pin and turns the sector 199 more or less according to the setting of the slide 184. The sector 199 is carried around frictionally with the ratchet wheel 198 and it is provided on its rear end with a step 202. As the slides 184 and 185 are returned by carriage 187 after setting the sector 199 and slide 270, these parts are prevented from moving backward, the slide being held by the pawl 203, and the stepped sector by friction with the ratchet wheel. The slide 270 is connected to an interponent 205 by a link 206 which has a pin and slot connection 207 with the slide (Fig. 16). The link is drawn back constantly against the stepped sector 199 by a spring 208, and the slide 270 and its operating elbow lever 196 are drawn backward constantly by springs 209 and 210 respectively (Fig. 3). As the slide 197 is thrown forward it strikes the end of link 206 and presses it forward thus permitting the stepped end of sector 199 to descend. The interponent 205 slides on an arm 211 upon a vertically moving slide 212 and it moves back and forth under a series of word-space punches 213 which operate upon the strip 87 as it is drawn over a die 214 by the feed roll 92. Beneath the slide 212 is a slide 215 which moves up and down constantly, being operated by a forked lever 216 and a double cam 217 upon the running shaft 6 (Figs. 14 and 20). A rock shaft 218 is provided with a short arm 219 which is connected to the lever 216 by a rod 220. Loose upon the rock shaft 218 is an elbow lever 221 which has pivoted to its upper end a feeler wire 222 and to its lower end an interponent 223. The feeler is drawn downward positively by the T-piece upon the rod 220 and is yieldingly drawn upward by a spring 224 during each revolution of the running shaft. The feeler 222 is in line with the trip holes $b$ shown in Fig. 18 which indicates the word-spaces and whenever one of said trip holes comes opposite the feeler the latter is drawn into it by the spring 224, the elbow lever 221 is rocked, the interponent 223 passes in between the constantly moving slide 215 and the slide 212 and the latter is raised thus driving the interponent 205 against one of the word-space punches 213 and punching a word-space hole $w$ in the strip (Figs. 14 and 16). A pawl 225 engages the teeth of the ratchet wheel 198 (Fig. 16). The lower end of this pawl is connected to one end of a lever 226 and the opposite end is connected with the slide 212 by a link 227. Each time a word-space impression is made in the strip, the slide 212 operates the lever 226 and through the pawl 225 moves the ratchet wheel 198 one tooth. As the ratchet wheel 198 moves, it carries with it the stepped sector 199, and as soon as the step 202 passes the link 206 the latter is drawn forward by its spring 208, thus shifting the interponent 205 from one punch to the next, which corresponds to a difference of one unit in the spaces which are selected by the perforations made by the punches.

The mechanism for shifting the interponent 205, above outlined, illustrates one way in which justification, according to the quotient and remainder principle, may be effected. Broadly stated, all that is necessary to effect justification on this principle is a device adapted to be set so as to insert or control the insertion in each line of a number of words spaces of quotient value, and means for shifting said device so as to effect the insertion of as many spaces of quotient plus one unit valve as there are units in the remainder, if there be one. The quotient plus one unit spaces may be inserted either before or after the quotient spaces. In either case the word spaces are inserted consecutively from one end of the line to the other, the larger spaces differing from the smaller ones by a single unit. In the present instance the justifying mechanism simply places word space selecting impressions and produces a justified controller; but by the same method and with slightly modified mechanism, justification may be effected in matrix making, linotype, type setting and other composing machines without the use of a controller.

The term "word space" as used in the preceding paragraphs and in the claims relating to justification is to be understood and construed as referring to the distance or space between words, and not to the concrete spaces or quads which are used in setting up type. In its broad sense, the term "word space," as herein used, applies to any and all classes of composing machines.

In the justifying mechanism hereinbefore described, the quotient word spaces are determined by the position of the stepped part or sector 199 and the link 206 which co-operates with it. These parts may be set to determine word spaces of any given value and during the operation of justifying a line, after the quotient spaces have been provided for, the parts will be reset to determine the quotient plus remainder spaces. This, as above described, is accomplished by the pawl and ratchet wheel moving the stepped sector relatively to the link 206 and, as shown, its effect is to shift the interponent from one punch to the next as the link passes the step of the sector, if there be a remainder.

The stepped part, instead of being a sector, might be a slide or any other mechanical movement capable of shifting the interponent or word space selecting device one step or unit. The stepped part is set for each line by two movements, one movement, such as that imparted by the slide 270 corresponding with the value or size of the quotient spaces, and a second movement corresponding with the number of quotient spaces, such as the movement of the sector upon its axis. The latter movement I shall term a forward movement, and in the operation of justifying a line each time a quotient space is inserted, the stepped part is moved backward one notch, or such an amount as will bring the step into operation after the last quotient space has been inserted. The step then shifts the space inserting device (the interponent) one unit, and during the remainder of the line quotient plus one unit spaces are inserted.

In Fig. 24 I have shown a modification of the mechanism for shifting the word space inserting device so as to insert spaces one unit larger or smaller. In this instance the stepped part consists of a rack 290 which is provided with a number of teeth. A spring 291 tends to give the rack a backward movement and it is held against such movement by an escape pawl 292. The rack 290 carries an interponent 293 which is operated as heretofore described by the slide 212. The pawl 292 is tripped to permit the rack 290 to move backward one step by a lever 294 which is carried frictionally by a ratchet wheel 295. The ratchet wheel is moved backward one notch for each word space inserted by means of the pawl 225, lever 226, and link 227 connected with the slide 212. The devices above described are set at the beginning of each line by moving the rack 290 to place the interponent 293 under the proper punch for the word spaces to be first inserted and also moving the tripping lever 294 forward to such an extent that the backward movement given to it by the pawl 295 will bring it at the proper time into contact with the pawl 292, and thus permit the rack 290 and the interponent 293 to be shifted one step. It will be seen that it requires two movements, one according to quotient and the other according to remainder to set this modified mechanism. This mechanism illustrates one of the many modifications which are adapted to shift the word space inserting device so as to increase or decrease the word spaces by a single unit.

The word space inserting mechanism and the justifier proper may be in a separate and independent machine if desired, in which case the justifier might be set by hand, or by means of suitable keys, in accordance with a record of the total word space and number of word spaces in each line which might be printed or marked upon the strip as it leaves the first perforating machine. I prefer however to arrange the second perforator in a common machine with the first and to use a mechanical agent such as the key-piece, to communicate the values of the quotient and remainder for each line to the justifier of the second perforating device.

The feed roll 92 is operated with a star wheel 228 (Figs. 9 and 20) which is operated by a spring pawl 229 and fixed pawl 230 upon a slide 231. The operations of these parts are exactly similar to the parts 118 to 121 inclusive for operating the other feed roll. There is also a holding pawl 232 to prevent backward movement of the feed roll. The slide 231 is normally drawn down by a spring 233 and its lower end is connected by a link 234 to a cam lever 235 which rests upon a cam 236 on the running shaft 6.

As shown in Figs. 9 and 20, the slide 231 is locked in its uppermost position by a bolt 237, one end of which lies under a spring piece 238 which is fixed to the slide; and the bolt 237 is locked in this position by the hooked end of a locking lever 239. These parts hold the lever 235 up so that it is not affected by the cam 236. When the starting shaft 105 revolves a cam 240 on said shaft moves the lever 239, which releases the bolt 237 and the latter is thrown back by a spring 241 (Fig. 9). The slide 231 then drops and is reciprocated, thus moving forward the star wheel 228 and feed roll 92, until the bolt 237 is again thrown forward to intercept it.

Upon the feeler shaft 218 is an arm 242 carrying a stop feeler 243 (Figs. 12 and 20). After a portion of the strip included between two of the line stop holes c, c, (Figs. 18 and 19) has passed the feed roll 92 and the word-space perforations for that line have been inserted, the stop feeler 243 drops into a stop hole c and rocks the shaft 218 (Figs. 12, 13, 16 and 20). The arm 242 is constantly drawn upward by a spring 244. When the shaft 218 is rocked as above described, an arm 245 throws an interponent 246 in between the slide 215 and the lever 247 upon a stop shaft 248. On the rear end of the shaft 248 is an arm 249 (Figs. 9 and 20) which engages a pin upon the bolt 237 and throws the bolt forward under the stop 238 of the slide 231 thus stopping the movement of the star wheel 228. When the bolt is thrown forward, it is immediately locked by the locking lever 239 and it remains locked until the starting key is again depressed. Upon the forward end of the stop shaft 248 is an arm 250 which engages the tail end of the pawl 203 and releases the slide 270. The spring 209 then returns the slide 270 and the ratchet wheel 198 and sector 199 mounted thereon to their forward positions ready to be set by the key-piece when the starting key is again operated.

During the first portion of the revolution of the starting shaft, a cam 152 (Figs. 7, 8 and 16) releases a lever 153 which is thrown down by a spring 154. The lever 153 is connected by a link 155 to a bolt 156 which is thus thrown downward and passes into one of a series of perforations 157 in a plate carried by the rack 178. The bolt also passes between the teeth of the rack 173 and it thus locks the key piece from movement in either direction during the time that the setting is being taken by the slides 184 and 185 from the key. During the latter part of the revolution of the starting shaft, the bolt 156 is raised by the cam and it is held up until the starting key is again depressed.

The pawls 163, 164 which operate the ratchet wheel 162 (Fig. 7) are thrown out of engagement with said wheel to permit the pointer to return to zero on the dial by means of a lever 260, which lever is normally locked by a latch 261 as shown in Fig. 7. During the revolution of the starting shaft 105 the latch is thrown back by a pin 262 and the lever 260 is afterward rocked by a cam 263, thus disengaging the pawls 163, 164 and permitting the indicator 161 and the slide 169 and connected parts to be returned to their normal positions by the springs 267 (Fig. 2) and 265 (Figs. 10 and 11). A link 266 connects the lever 260 with the holding pawl 179 and effects the raising of said pawl and the release of the rack 178 when the lever 260 is rocked.

The word-space impression device works more rapidly than the device for making the character impressions, and the feed roll 92 usually has a period of rest at the end of each line between the time that the feeler enters a line hole c and the operation of the starting key to justify the succeeding line. During this period of rest, the feelers 222 and 243, if constantly operated, might pierce holes in the stationary strip. To prevent this I provide shoulders upon the arms or levers carrying the feelers and upon the stop shaft 248 spring arms adapted to engage these shoulders when the stop shaft is operated, and thus lock the feelers out of contact with the paper until the starting shaft is again rocked. As shown in Fig. 22 there is a spring arm 298 in contact with the shoulder 297 thus preventing the feeler 222 from entering the paper. In Fig. 23 the spring arm 298 is shown in its inoperative position which permits the feeler 222 to operate upon the paper strip. When the feeler 243 finds a line stop hole c the stop shaft 248 is rocked, as heretofore described. This will throw the spring arm down upon the upper face 296 of the shoulder 297 and upon the withdrawal of the feeler by the rod 220 the elbow lever 221 will be rocked and the arm 298 will spring into engagement with the shoulder 297, as shown in Fig. 22 and thus render the feeler inoperative. Similar stops are used for each of the feelers 222 and 243.

I have shown in Fig. 1 and elsewhere the character keys as mounted on a movable carriage 309 provided with guides 308. This illustrates one means by which a single set of character keys may be made to operate to select upper and lower case letters. The carriage 309 is shifted by means of a key 310 on a lever 311, said lever operating an elbow lever 312 pivoted to the back of the carriage. The depending arm of the elbow lever 312 is in engagement with the base and when the horizontal arm is elevated by the shift key 310, the key carriage 309 is thrown to the right. When the shift key is released, the carriage is returned to its normal position by means of the spring 313. In the two positions of the carriage, the keys stand over different slides, one set of slides representing upper case and the other representing lower case characters. As this part of the machine is not of my invention, a more particular description thereof is not thought essential.

The operation of many parts of the machine has been recited in connection with the description of the mechanism. I shall now describe the operation of the entire machine as nearly as possible in the order in which the movements take place. The paper strip 87 is passed through the machine in the manner shown in Fig. 12. It may be here stated that I may use needle points or prickers on the first feed roll 91 which will draw a blank strip over the die 90, thus avoiding any trouble in starting the machine due to the absence of feed holes in the strip. After the machine is started the feed holes are punched regularly along with the other perforations.

In commencing a line the key for the first character is depressed, its corresponding slide 22 is moved, and three of the permutation bars 24 are rocked. The three rods connected to these three bars will be projected rearwardly through the disks 70, 71 and 72 respectively into the slots of the T-slides in the rear of these disks. At the same time the common slide 29 through the connections 30 to 33 inclusive will operate the clutch and engage the escape shaft with the constantly running shaft, thereby imparting to the escape shaft one complete revolution. One effect of the revolution of the escape shaft is to rock the disk 70, 71 and 72 a quarter revolution or until their slots in which the rods are carried assume a vertical position. This movement always depresses the space-key slide 79 as its operating bars are on one side of the center of its disk 72. The slides 77 and 78 may be either raised or depressed depending upon whether the bars which operate them are at the right or left of the centers of their disk. The T-slides operating through pinions and connecting shafts move the racks carrying the interponents and place the interponents over three punches, one in each of the groups of punches (Figs. 5, 6, and 14). The T-slides and interponents have a moment of rest before being returned to their normal positions while the crank pin 76 moves in the slot in the connecting rod 75 (Fig. 4) and during this moment the striker frame which carries the interponents is drawn downward, thus producing one space selecting and two die selecting perforations in the paper corresponding to the key which was operated. At the same time two feed holes are punched in the margins of the paper by punches attached to the striker frame. The striker frame is drawn down quickly and returned by the cam 65 upon the escape shaft. Connected with the T-slides 77 and 78 is the bank of type which prints the record upon the strip, and the movements of the slides are communicated to the type carrier and bring the particular type corresponding to the key depressed under the hammer 149. As the striker descends to perforate the paper it operates the hammer 149 which drives the type against the ink ribbon and impresses the character upon the strip. The space T-slide 79 always descends during the first movement of its disk 72 and carries down the pawl 163. As the slide rises, this pawl feeds the ratchet wheel 162 and the pointer of the dial forward a distance corresponding to the width of the letter. The rocking movement of the disk 72 is also utilized to operate through connections 124 to 129 inclusive (Figs. 9 and 12) the elbow lever 123 which through the slide 121 and its pawl feeds the star wheel 118 and the feed roll 91. This operation takes place during the last half of the revolution of the escape shaft and while the T-slides are returning to their normal positions. At the same time the lever 123 operates the pawl 136 and feeds the ribbon forward a step. For each character key depressed the same cycle of operations takes place, the perforations are made in the paper strip corresponding with the character and its space, the character is printed on the strip and the pointer moves forward upon the dial an amount corresponding with the width of the type. At the end of each word the space key is operated. This key, through its lever 35, operates the slide 29 and starts the escape shaft. It also rocks the shaft 41 which through connections shown in Fig. 14 throws the interponent 94 off of the regular space punch onto the trip punch 93 and as the striker descends a trip hole is punched instead of a space hole. Two punches in the character selecting series which the interponents stand normally over are driven down and perforations x'—y' made in the strip which will select a blank matrix or die in the final composing machine. These perforatoins, however, may be omitted in which case the interponents would be arranged to stand normally at one side of the punches. The shaft 41 through its arm 181 also depresses the pawl 182 and the slide or rack 178 carrying with it the key piece which is moved one step. In this manner the key piece is moved one step to the right each time the space-key is operated and its position in that direction at the end of the line depends on the number of spaces in the line. The operation of the key in the direction at right angles to slide 178 is determined by the amount of matter in the line corresponding to that indicated upon the dial. Instead of transmitting the entire dial movement to the key, only the latter part of this movement is transmitted, a fixed part comprising most of the movement, being deducted each time. This movement is transmitted to the key space through the slide 169 and the pinions 172. The movement of the key piece in this direction therefore depends upon the total width of the characters in the line. At the end of each line, the line or starting key 42 is depressed which rocks the shaft 44 and engages the starting shaft 105 with the constantly moving gear 107 by means of the clutch mechanism shown in Fig. 9. The starting shaft makes a complete revolution and then stops, during which time the following operations take place: A crank 189 upon the forward end of the starting shaft raises the slide 187 (Fig. 4) and carries with it the setting slides 184 and 185 which have been previously set by the key piece for the line previously written (not the line just finished). It may here be explained that there is a portion of the strip intervening between the character perforating mechanism and the feed roll 92 of the space perforating mechanism varying from one to two lines in extent so that the character perforating mechanism is always at least one line in advance of the space punches and at the time the starting key is operated it is just two lines in advance. The slide 185 through the elbow lever 196 sets the slide 270 which is locked in position by the pawl 203. At the same time an arm 201 sets the stepped sector 199 which is carried by the slide 270. The slide 270 also carries a link 206 to which the interponent 205 is attached, and this interponent is set beneath one of the punches 213 corresponding to the quotient space plus one unit if there be any remainder in the line. The interponent 105 is carried by a slide 212 the operation of which will be explained later, and as each space hole is punched by the interponent, the ratchet wheel 198 is moved one notch carrying with it frictionally the stepped sector 199. If the spaces in the line are not of uniform width, then the stepped sector will be so set that the movement of the ratchet wheel 198 as the space holes are punched for the larger spaces, will carry the sector 199 around so that the interponent link 206 will pass over the step after the hole for the last large space has been punched and the interponent will be moved so as to punch holes for a space one unit smaller. The operation of this mechanism may be reversed so that the smaller holes may be punched first and the larger holes afterward. The slide 270 and lever 199 are set during the first quarter of the revolution of the starting shaft. During the next half revolution the slide 187 is carried down to its lowest position and the feet 186 of the slides 184 and 185 are dropped upon a key of the key-piece and then locked in position, as set by this key, by the pawl 191. While the slides are being set by the key, the key piece is locked against movement in either direction by the bolt 156 (Fig. 8). During the final quarter revolution of the starting shaft the slide 187 is raised and the slides 184 and 185 retain their setting, which is imparted to the interponent 205 of the space punches at the next movement of the starting shaft. During the revolution of the starting shaft, the cam 104 through the rock shaft 102 sets an interponent 100 over the special punch 99, and the cam 18 through the lever 17 and lifter 13 (Fig. 12) operates the clutch which starts the escape shaft and the striker descends punching the line hole c with the special punch (Fig. 18). The slide 212 which carries the interponent 205 is only moved when a space between word perforations comes opposite to the space punches. It will be remembered that these spaces are indicated by trip holes b made by the special punch 93. The feeler 222 is drawn up against the paper strip at each revolution of the running shaft by its spring 224 as shown in Fig. 14. When a trip hole is presented to a feeler, it passes through the hole and the elbow lever which carries it is rocked, thus throwing the interponent 223 between the constantly moving slide 215 and the slide 212. The latter is carried up by the slide 215 and punches a space hole adjacent to the trip hole, (Figs. 14 and 16.) At the next revolution of the running shaft, the feeler is withdrawn and no more space holes are punched until the trip hole at the end of the succeeding word is presented to the feeler. The feed roll 92 which feeds the paper strip to the space punches is rotated step by step by the star wheel and pawls 228, 229 and 230 (Fig. 9). The slide carrying the pawls is connected with the cam lever 235 which rests on the cam 236 of the running shaft. This cam tends to give the slide a constant movement, but it is normally locked in its upper position by the bolt 237 which renders the cam inoperative. During the rotation of the starting shaft the bolt 237 is withdrawn and the star wheel and pawls are then continuously operated until the bolt is again thrown forward to intercept the movements of the pawls. This operation is interruped when the feeler 243 (Fig. 12) enters the next stop hole c. When the feeler enters this hole, the shaft 218 is rocked and the interponent 246 thrown in between the constantly moving slide 215 and a rock arm 247 (Figs. 12, 13, and 16). The slide 215 on rising rocks the arm 247 and its shaft 248 and an arm 249 (Fig. 9) on one end of the shaft 248 throws the bolt 237 under the stop piece 238 of slide 231, thus locking the slide against any further movement until the starting shaft is again operated. An arm 250 on the opposite end of shaft 248 releases the slide 270 from its holding pawl 203 (Fig. 16). The stop 238 is a spring plate which permits the bolt to be thrown over while the slide is rising and springs over the bolt when the slide reaches its highest position. During the revolution of the starting shaft, the latch 261 is thrown back by a pin 262 on the face of cam 263 and the cam thereupon operates the lever 260, which lifts the pawls 163, 164 from the ratchet wheel 162 permitting the pointer to be returned to zero on the dial by its spring 264 (Figs. 2 and 7) and permitting the slides 169 and 173 to be returned to their initial positions by the spring 265 operating through gearing 172 (Figs. 7 and 11). The elbow lever 260 through a connection 266 (Fig. 7) raises the holding pawl 179 and permits the spring 267 to return the word space rack 178 to its initial position. By the return of the ranks 173 and 178 to their initial positions the keypiece is brought to its initial or starting position with the key on its forward right hand corner under the feet 186. These return movements of the various parts leave the machine ready to begin a new line of print. The starting shaft revolves rapidly and does not delay the operator. The mechanism for making the word-space or justifying perforations runs and stops automatically. Being operated directly from the running shaft, its movement is quite rapid and being independent of the escape shaft it may continue running if necessary while the operator is manipulating the keys for another line of matter. Briefly, the operation of the entire machine, so far as the manual labor employed is concerned, is exactly like the operation of a typewriter, with this exception, that instead of returning the platen and attending to the line spacing, as in operating a typewriter, the operator simply depresses the line space key at the end of each line.

The justified controller produced and the method of producing it have been fully described. The manner in which the controller is afterward used in connection with a composing machine does not pertain to the present application. In my pending applications, Serial Nos. 498,338, filed January 29, 1894, and 522,211, filed September 5, 1894, will be found descriptions of two type casting and composing machines which produce justified lines of type assembled in regular order in galleys, the entire operation of the machines being governed by the controlling strip made by the present machine.

As above stated, many of the parts shown and described in this application may be utilized in various kinds of composing machines. On the other hand mechanical equivalents may be substituted for many of the elements of the present machine. For instance a single punch may be substituted for each of the interponents and be made to do the work of the interponents and their groups of punches, the single punches being shifted by the interponent slides. It is to be understood therefore, that I do not limit my claims to the precise construction and arrangement of parts shown and described and that I desire protection of the various elements of the invention commensurate with the scope of their usefulness.

Having described the nature and objects of my invention, what I claim as new, and desire to secure by Letters Patent, is—

1. In a machine of the class described, mechanism for inserting justifying word space impressions upon a controller, the same consisting of a feeding device for the controller, an impression device, and means governed by the controller for bringing said impression device into action each time a space between word groups of impressions is presented to it, substantially as described.

2. In a machine of the class described, the combination with devices for producing character-selecting impressions, of a justifying device, and means controlled thereby for producing justifying impressions, whereby a justified controller may be produced, substantially as described.

3. In a machine of the class described, the combination with devices for producing character-selecting impressions, of a justifying device, and a second impression device controlled by the justifying device and arranged to insert word-space impressions adapted to select justifying word-spaces, substantially as described.

4. The combination with a feeding device for a controller strip, and means for producing character-selecting impressions, of a second and independent feeding device, and means for producing justifying word space impressions between the word groups of character selecting impressions, substantially as described.

5. In a machine of the class described, the combination of a primary impression device constructed to make character selecting impressions, and trip impressions to indicate the intervals between the words, with a second impression device arranged to be brought into action by the trip impressions and constructed to produce justifying word-space selecting impressions, substantially as described.

6. In a machine of the class described, the combination with a primary impression device constructed to make character selecting impressions and character space impressions, of a second and independent impression device and a justifying device for controlling said second impression device, whereby proper word-space selecting impressions for justifying are produced, substantially as described.

7. In a machine of the class described, the combination with a primary impression device arranged to make character-selecting impressions, a bank of keys, and connections between said keys and said impression device, of a justifying device, and a second impression device controlled by the justifying device and adapted to insert justifying word-space selecting impressions, substantially as described.

8. In a machine of the class described, the combination with slides, and rocking disks arranged adjacent to said slides, a series of rods having parts normally carried by said disks, a bank of character keys, and connections between said keys and rods whereby the latter may be projected into engagement with the slides, substantially as described.

9. The combination with T-slides, and rocking disks, of the rods having their rear ends carried by the disks, the rocking blades connected with the forward ends of the rods, and the slides and character keys for moving the blades, substantially as described.

10. The combination with character keys, rods operated by said keys, and movable disks and slides, of punches adapted to produce character selecting impressions upon a strip or the like, and means for operating said punches, substantially as described.

11. The combination with the character-keys, the groups of rods operated thereby, the rocking disks and the T-slides, of two sets of punches for making character selecting impressions upon a controller strip, a striker for operating the punches, and interponents for selecting the punches, said interponents being connected with the T-slides, substantially as described.

12. In a machine of the class described, the combination with a group of punches, of a common striker for the punches, an interponent movable between the striker and the punches, a bank of character keys, and connections between said keys and the interponent for moving the latter, substantially as described.

13. The combination with one or more groups of punches, of a common striker for said punches, an interponent for each group of punches, character-keys, and connections between the character keys and the interponents for moving the latter, substantially as described.

14. The combination with one or more groups of punches, a striker, interponents between the striker and the punches, T-slides connected with the interponents, rocking disks, and rods arranged transversely of the disks and adapted to be projected into engagement with the T-slides, substantially as described.

15. The combination with a group of punches or impression devices, of a common striker, a common interponent movable for selecting the punches, character keys and connections through which said keys control the interponent, an escape shaft adapted to be started by the character-keys, and connections between the escape shaft and the striker, substantially as described.

16. The combination with character keys, T-slides, and intermediate connections, of punches for making character-selecting impressions, interponents for selecting the punches, a striker for the interponents, slides connected with the interponents for moving the latter, and racks, pinions, and shafts connecting said slides with the T-slides, substantially as described.

17. In a machine of the class described, the combination with a character key, of two impression devices arranged to make character selecting impressions upon a controller corresponding to said key, a bank of type movable in two directions to center selected type, mechanism controlled by the key for making one of said impressions and moving the bank of type in one direction, and different mechanism, also controlled by the key, for making the second impression and imparting the other movement to the bank of type, substantially as described.

18. The combination with the character keys, of a series of punches, interponents controlled by the character keys, a bank of type connected with the interponents, a striker for the interponents and a hammer or impression device for the type, substantially as described.

19. The combination with the character keys and the T-slides controlled by the character keys, of a series of punches, interponents connected with the T-slides, a bank of type connected with the interponents, a striker for the interponents, and a hammer or impression device for the type connected and operated simultaneously with the striker, substantially as described.

20. The combination with a set of character-keys, of two groups of punches for making character-selecting impressions upon a controller, a striker for operating the punches, interponents for selecting the punches, a typewriter arranged to record the characters upon the strip consisting of a bank of type movable in two directions, an escape shaft, and mechanism operated by the escape shaft and controlled by the character keys for simultaneously moving the interponents and moving the bank of type in two directions to center selected characters, substantially as described.

21. The combination with a set of character-keys, of two groups of punches for making character-selecting impressions upon a controller strip, two interponents for selecting said punches, a type carrier mounted in a sliding yoke, and having a movement therein transverse to that of the yoke, a pair of T-slides controlled by the character-keys, one of said slides being connected with the yoke and one of the interponents and the other slide being connected with a second interponent and arranged to move the type carrier in the yoke, substantially as described.

22. In a machine of the class described, the combination with a common striker, of two sets of punches for making character-selecting impressions in a controller strip, a set of punches for making character space impressions, a special trip impression punch arranged to make word space indicating impressions, and interponents for selecting the punches substantially as described.

23. In a michine of the class described, the combination with a striker and die plate, of sets of punches for making character and space selecting impressions on a controller strip, special punches for indicating word spaces and lines, and interponents for selecting any of said punches, substantially as described.

24. The combination with the rocking disks, the T-slides, the rods arranged in transverse series in the disks, and the character keys and connections for moving the rods, of a space counting dial and index operated by one of said T-slides and means controlled by the remaining T-slides for making character selecting impressions upon the controller, substantially as described.

25. In justifying mechanism, a key-piece capable of two movements and provided with a series of setting surfaces, the configuration of said surfaces being predetermined for the justification of different lines, substantially as described.

26. In justifying mechanism, a key-piece capable of two movements and provided with a series of setting surfaces, the configuration of said surfaces being predetermined for the justification of different lines, in combination with space and character keys and connections of the same for moving the key-piece, substantially as described.

27. In mechanism adapted to effect justification upon the quotient and remainder principle, a key-piece movable in two directions and provided with a series of individual keys, each key having two setting surfaces constructed to govern the introduction of word spaces in a line according to the quotient and remainder obtained for said line by dividing the total word-space by the number of word-spaces, substantially as described.

28. The combination with a bank of character-keys and a word-space key, of a key-piece having two movements, one movement being controlled according to the character spaces and the other according to the number of word-spaces, said key-piece being provided with a series of keys arranged in rows and constructed to control justifying operations, substantially as described.

29. In justifying mechanism, a word-space determining device adapted to be set for word spaces of any given value, in combination with automatic mechanism for resetting said device, if necessary, after a portion of the word-spaces of a line have been determined, to effect justification by uniformly increasing or decreasing the remaining word spaces, substantially as described.

30. In justifying mechanism operating according to the quotient and remainder principle, a word-space determining device adapted to be set for word spaces of any given value, in combination with mechanism for resetting said device, if there be a remainder, after a portion of the word spaces have been determined, to effect justification by increasing or decreasing the remaining word spaces uniformly by a single unit, substantially as described.

31. In justifying mechanism, a word space determining device adapted to be set for word spaces of any given value by a forward movement, in combination with mechanism for imparting to said device a backward movement during the justification of a line, substantially as described.

32. In justifying mechanism, a word space determining device adapted to be set for word spaces of any given value, embracing a stepped part having two movements for setting said device, one movement according to quotient and the other according to remainder, in combination with means for feeding said stepped part backward during the operation of said device, substantially as described.

33. In justifying mechanism, a word-space determining device adapted to be set for word spaces of any given value, and embracing a stepped part, in combination with a ratchet for moving said part, and a pawl connected with the device and operating on the ratchet, whereby the movements of said device may bring into action the step to change the setting of the device, substantially as described.

34. In justifying mechanism, a word space determining device adapted to be set to determine word spaces, a key-piece capable of adjustment by two movements, respectively in accordance with the amount of character space and number of word spaces in a line and having a series of setting surfaces predetermined for the justification of different lines, and intermediate mechanism whereby said device may be set and controlled from the key-piece, substantially as described.

35. In justifying mechanism, in combination with a word space determining device, embracing a stepped part arranged to be set by two movements, a key-piece provided with keys, each having two setting surfaces, and means for setting the stepped part by the key-piece, substantially as described.

36. In justifying mechanism, a word-space determining device adapted to be set to determine word-spaces, a key-piece, a transfer carriage and devices carried thereby for transferring a setting from the key-piece to the space determining device, and mechanism constructed to move said carriage from an intermediate position to the space determining device to impart its previous setting, then to the key-piece to receive a new setting, and then to the intermediate position, whereby the transfer of a setting may be delayed, substantially as described.

37. In justifying mechanism, a stepped part capable of two movements, a key-piece provided with keys each having two setting surfaces, a transfer carriage provided with devices for transferring a setting from the key-piece to the stepped part, and mechanism constructed to move said carriage from an intermediate position to impart its previous setting to the stepped part, then to the key-piece to receive a new setting, and lastly to the intermediate position, whereby the transfer of a setting may be delayed, substantially as described.

38. In justifying mechanism, a word-space determining device adapted to be set to determine word-spaces of uniform value, embracing a stepped part arranged to be set by two movements, one movement according to quotient and the other according to remainder, in combination with a key-piece provided with keys each having two setting surfaces, and a pair of setting transfer slides adapted to be set by a key of the key-piece and movable to transfer said setting to the stepped part, substantially as described.

39. The combination with the key-piece and the stepped part capable of two movements, of the transfer carriage, and the setting transfer slides mounted in said carriage, said slides being adapted to be set by the key-piece and to transfer their setting to the stepped part, substantially as described.

40. In justifying mechanism, the transfer carriage, the setting transfer slides provided with racks and mounted in the carriage, the common pawl pivoted on the carriage and arranged to engage the racks, and the switch for disengaging the pawl from the racks as the carriage is lowered, substantially as described.

41. The combination with a word space impression device consisting of a series of punches, of an interponent movable to select punches, a stepped part capable of two movements, and connections intermediate the interponent and the stepped part whereby the former is controlled by the latter, substantially as described.

42. In mechanism for inserting word space impressions, a series of punches, an interponent movable to select punches, a movable part for driving the interponent, a stepped part capable of two movements and arranged to place the interponent, a ratchet connected with said part, and a pawl operating upon the ratchet, said pawl being connected with the movable part which drives the interponent, substantially as described.

43. In justifying mechanism, the combination with the key-piece movable in two directions and provided with a series of individual keys, of the starting shaft and means operated by said shaft and constructed to lock the key-piece to prevent movement while its setting is being transferred, substantially as described.

44. The combination with the movable justifier key-piece, of a carriage movable to and from said key-piece, a pair of setting transfer slides mounted in said carriage and provided with racks or teeth, a pawl also mounted on said carriage and arranged to engage the teeth to hold the slides, and means for releasing the pawl from the slides when the setting has been transferred, substantially as described.

45. In a machine of the class described, the combination with a stepped part capable of two adjustments, one corresponding to quotient and the other to remainder, of a ratchet wheel for moving the stepped part, a series of punches for making word-space selecting impressions, an interponent controlled by said part, a slide for driving the interponent, and a pawl connected with the slide and arranged to operate the ratchet wheel and effect a backward movement of the stepped part, whereby the step may be brought into action to change the adjustment of the interponent, substantially as described.

46. In a machine of the class described, an impression device constructed to insert word space impressions, means for feeding a controller to said device, and means controlled by trip impressions upon the controller, for bringing said impression device into action, substantially as described.

47. In a machine of the class described, the combination with means for producing trip impressions to indicate word-spaces, of a feeler in the line of said impressions, a word-space impression device, and means whereby said device is brought into action each time the feeler finds a trip impression, whereby justifying word-spaces may be inserted, substantially as described.

48. The combination with means for producing trip impressions in a controller to indicate word-spaces, of a feeler and means for reciprocating the same in the line of said impressions, a word-space impression device consisting of a series of punches, an interponent for selecting the punches, a constantly moving slide, and an interponent connected with the feeler and arranged to interpose between the moving slide and the first named interponent, or its support, each time the feeler finds a trip impression in the controller, substantially as described.

49. The combination with means for making impressions in a controller to indicate the division into lines, of an impression device arranged to make justifying word-space selecting impressions, a feeler arranged in the path of the line impressions, mechanism for feeding the controller to the word-space impression device, and a stopping device for said mechanism arranged to be brought into action each time the feeler finds a line impression, substantially as described.

50. The combination with means for making impressions in a controller to indicate the division into lines, of an impression device arranged to make justifying word-space selecting impressions, a feeler arranged to vibrate upon the controller in the path of the line impressions, mechanism for feeding the controller to the word-space impression device, a sliding bolt arranged to stop the feeding mechanism, a constantly moving slide or part, and an interponent connected with the feeler and arranged to interpose in the path of said slide, to throw the bolt each time the feeler finds a line impression, substantially as described.

51. The method of making a justified controller for composing machines which consists, first, in making character-selecting impressions therein in sequence to form the words of a line, "trip" impressions to indicate the word-spaces, and line impressions to indicate the ends of the line, then determining the widths of the word-spaces necessary to justify the line, and finally inserting word-space selecting impressions adjacent to the "trip" impressions and adapted to select such spaces in the composing machine as will perfectly justify the line of type, substantially as described.

In testimony whereof I affix my signature in presence of two witnesses.

F. AMOS JOHNSON.

Witnesses:
E. A. HENDRICKSON,
J. A. WATSON.